United States Patent
Pauquet et al.

(10) Patent No.: US 7,786,199 B2
(45) Date of Patent: Aug. 31, 2010

(54) FLAME-RETARDANTS

(75) Inventors: Jean-Roch Pauquet, Kaiseraugst (CH);
Grant Leslie, East Lothian (GB);
Natacha Berthelon, Village Neuf (FR);
Daniel Müller, Basel (CH)

(73) Assignee: Ciba Specialty Chemicals Corp.,
Tarrytown, NY (US)

( * ) Notice: Subject to any disclaimer, the term of this patent is extended or adjusted under 35 U.S.C. 154(b) by 256 days.

(21) Appl. No.: 11/596,731

(22) PCT Filed: May 18, 2005

(86) PCT No.: PCT/EP2005/052268

§ 371 (c)(1),
(2), (4) Date: May 20, 2008

(87) PCT Pub. No.: WO2005/118697

PCT Pub. Date: Dec. 15, 2005

(65) Prior Publication Data

US 2008/0269383 A1    Oct. 30, 2008

(30) Foreign Application Priority Data

May 26, 2004    (EP)    .................................. 04102308

(51) Int. Cl.
*C08K 5/523*    (2006.01)

(52) U.S. Cl. ........................... 524/141; 524/99; 524/100
(58) Field of Classification Search ................. 524/117, 524/119, 120, 140, 141, 99, 100, 285, 569; 174/110 V See application file for complete search history.

(56) References Cited

U.S. PATENT DOCUMENTS

| | | | |
|---|---|---|---|
| 4,632,946 A | 12/1986 | Muench et al. | 523/179 |
| 6,284,822 B1 * | 9/2001 | Tamura et al. | 524/108 |
| 6,713,181 B2 * | 3/2004 | Gorny et al. | 428/412 |
| 2001/0036982 A1 | 11/2001 | Staniek | 524/123 |
| 2002/0035176 A1 | 3/2002 | King et al. | 524/140 |
| 2002/0151624 A1 | 10/2002 | Kobayashi | 524/115 |
| 2003/0078325 A1 | 4/2003 | Rose et al. | 524/141 |
| 2003/0158303 A1 | 8/2003 | Podszun et al. | 524/121 |
| 2003/0195281 A1 | 10/2003 | Janke et al. | 524/115 |

FOREIGN PATENT DOCUMENTS

| | | |
|---|---|---|
| EP | 1201714 | 5/2002 |
| WO | 00/17268 | 3/2000 |
| WO | 2004/007611 | 1/2004 |

* cited by examiner

*Primary Examiner*—Peter Szekely
(74) *Attorney, Agent, or Firm*—Tyler A. Stevenson

(57) ABSTRACT

Organic polymer compositions can be made flame-retardant by addition of selected organic phosphate and other components, such as known flame-retardants or conventional additives for further improvements, e.g. in flame retardancy or light stability.

6 Claims, No Drawings

FLAME-RETARDANTS

The instant invention pertains to a novel method of flame retarding an organic polymeric substrate by adding thereto an effective flame-retarding amount of a certain organic phosphate, to a corresponding use and a corresponding polymer composition, to synergistic blends of the phosphate with other flame-retardants and/or stabilizer components, as well as to a novel phosphate.

Halogenated organic phosphates have widely been used as flame-retardants (FR) in organic polymer compositions, often in combination with various synergists. Overall, a growing concern has arisen regarding the generation of smoke and toxic gases which are evolved from these flame-retardants during a fire. While the classic FR may be effective combustion suppressants, the toxic gases they form pose a threat to human exposure. Certain non-halo-generated phosphates have also been suggested for this use, thus opening a way to polymer compositions substantially free of halogen and antimony synergist while still fulfilling flame proof requirements, e.g. WO 99/00450; WO 02/074847. These compositions often require steadfastness enhancing components such as fillers or fibres, cf. WO 03/016388, GB-A-2344596. WO 02/074847 further recommends some organic phosphites for use as synergists in flame-retardant compositions. JP-A-2001-348724 discloses polypropylene fiber containing a certain mixture of an aryl phosphate and an alkoxy functionalized sterically hindered amine as flame-retardant.

It has now been found that a specific class of organic phosphates provides especially valuable properties as flame-retardant for organic polymers.

Thus, present invention pertains to a flame-retardant polymer composition, which comprises (A) An organic polymer substrate and
(B) An effective flame retarding amount of at least one compound of formula I and/or II

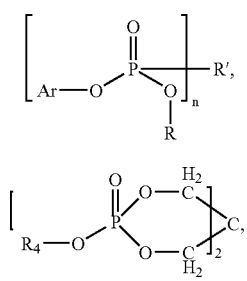

Wherein
n is 1 or 2 or 3;
Ar represents a group of the partial formula

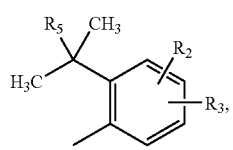

Wherein $R_2$ is tert-butyl or 1,1-dimethylbenzyl, $R_3$ is H or $C_1$-$C_{18}$alkyl and $R_5$ is methyl or phenyl; and R is as defined for Ar;

or R and Ar together are a group of the partial formula

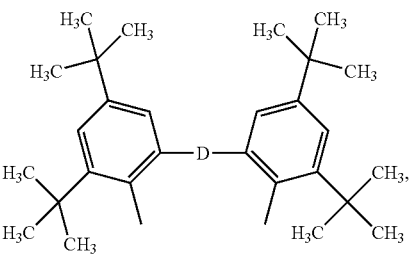

Wherein D is a direct bond or $C_1$-$C_4$alkylene;
when n is 1, R' is $C_6$-$C_{12}$aryl or $C_6$-$C_{12}$aryl substituted by $C_1$-$C_{18}$alkyl, or R' is $C_1$-$C_{12}$alkoxy or halogen;
when n is 2, R' is $C_6$-$C_{12}$arylene or the linking group —O-L-O—, where L is $C_2$-$C_6$alkylene; or O—R and R' together form the structure
when n is 3, R' is L-(O—)$_3$ where L is tri($C_2$-$C_4$alkylene) amino;
$R_4$ is H or $C_1$-$C_{18}$alkyl or is as defined for Ar.

Component (B) of the above composition is preferably present in an amount of 0.25-10.0% by weight, especially 0.35-5.0% by weight, based on the total weight of the polymer composition.

$C_1$-$C_{18}$Alkyl is branched or unbranched alkyl, for example embracing methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl.

$C_1$-$C_{12}$Alkoxy is an alkyl group containing 1-12 C-atoms, which is bonded over an oxygen linkage —O—.

$C_1$-$C_4$Alkylene and $C_2$-$C_6$alkylene are divalent radicals derived from branched or unbranched alkyl group containing 1-4 or 2-6 C-atoms, respectively, by abstraction of an hydrogen atom; bonds may be located on the same or on different C-atoms. Examples are methylene, 1,1-ethylene, 1,2-ethylene, 1,2-propylene, 1,3-propylene, 1,4-butylene, 1,5-pentylene, and 1,6-hexylene.

$C_6$-$C_{12}$Aryl stands for an aromatic hydrocarbon radical, for example phenyl or naphthyl. Within the scope of the stated definitions, aryl may, for example, be selected from phenyl, naphthyl, and also stands for biphenyl, or a residue of the formulae

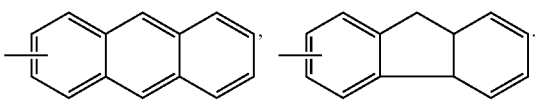

Preferred are phenyl, naphthyl, and biphenyl, especially phenyl.

$C_6$-$C_{12}$Aryl substituted by alkyl stands for the above aryl substituted by one or more alkyl group(s) such as those listed above for $C_1$-$C_{18}$alkyl; an example is alkyl-substituted phenyl such as tolyl or xylyl.

$C_6$-$C_{12}$Aryloxy is an aryl group containing 6-12 C-atoms, which is bonded over an oxygen linkage —O—.

Halogen in the above formula I is usually bromo, chloro or fluoro. Preferred is Cl or F, especially F.

$C_6$-$C_{12}$Arylene is a divalent radical derived from a $C_6$-$C_{12}$aryl group by abstraction of an additional hydrogen atom.

$C_3$-$C_6$Alkanetriyl is a trivalent radical derived from an alkyl group containing 3-6 C-atoms by abstraction of 2 hydrogen atoms; bonds may be located on the same or on different C-atoms, preferably not more than 2 bonds are located on the same carbon atom.

Tri($C_2$-$C_4$alkylene)amino is a trivalent radical consisting of a nitrogen atom bonding to 3 alkylene groups, each of which containing 2-4 C-atoms. Preferred is $N(CH_2CH_2)_3$.

According to a preferred embodiment, the invention relates to a composition, wherein in the compounds of formulae (I) and (II) of component (B) $R_2$ is 4-tert-butyl or 4-(1,1-dimethylbenzyl), $R_3$ is H or methyl, $R_4$ is $C_1$-$C_{18}$alkyl, R' defined as $C_6$-$C_{12}$aryl is phenyl or biphenyl, R' defined as halogen is fluoro, and R' defined as $C_6$-$C_{12}$arylene is phenylene or biphenylene.

Especially preferred is a composition wherein the compound of component (B) is of formula I. Examples of compounds of component B include the following structures:

a)
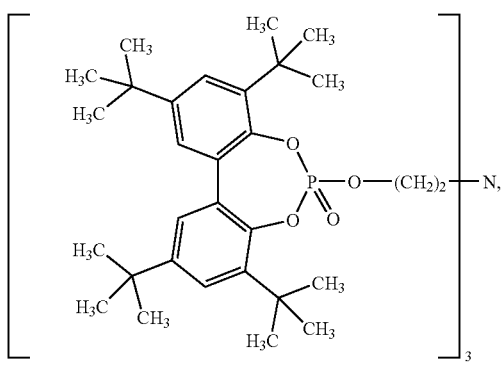

b)
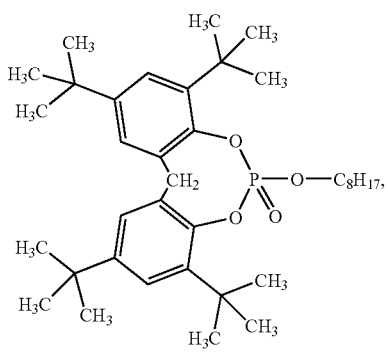

c)
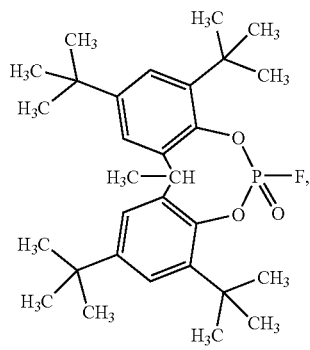

d)
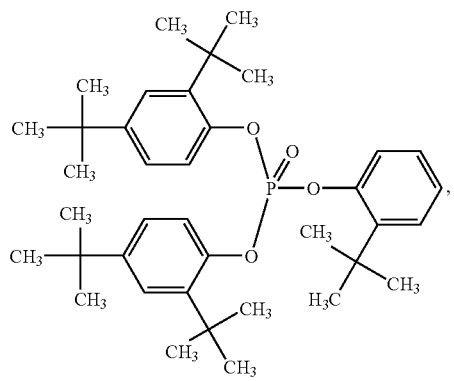

e)
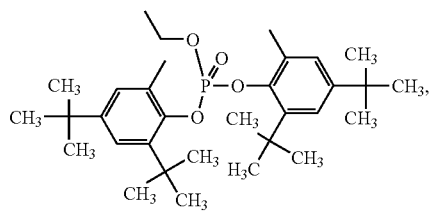

f)
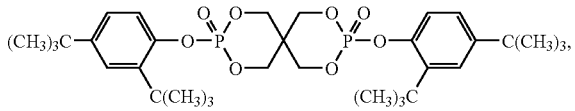

g)
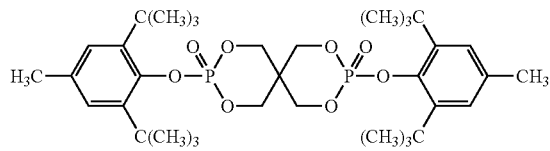

h)
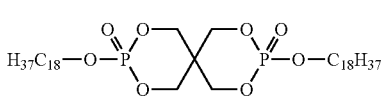

i)

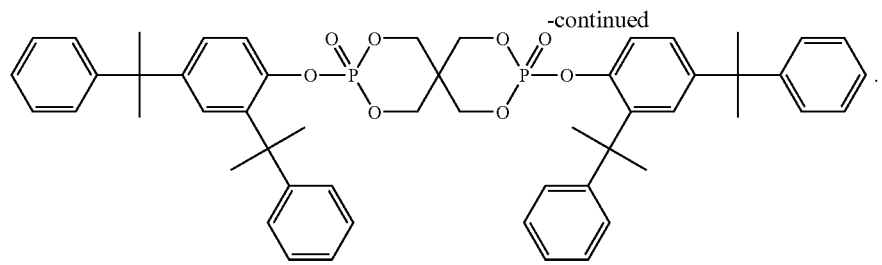
The phosphates of the formulae I or II of above may be obtained by oxidation of the corresponding phosphites. Suitable and commercially available precursors for the above phosphates and phosphonates are, inter alia, the following compounds:
a')
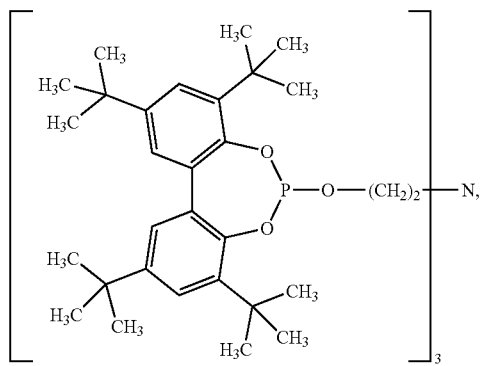
b')
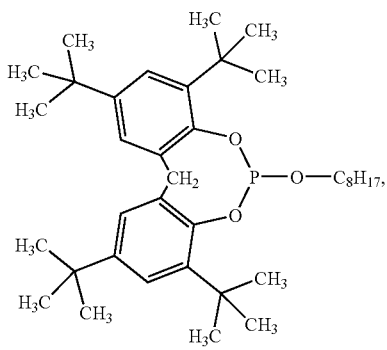
c')
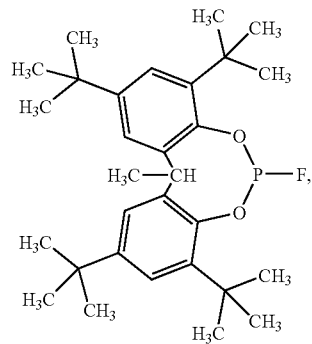
d')
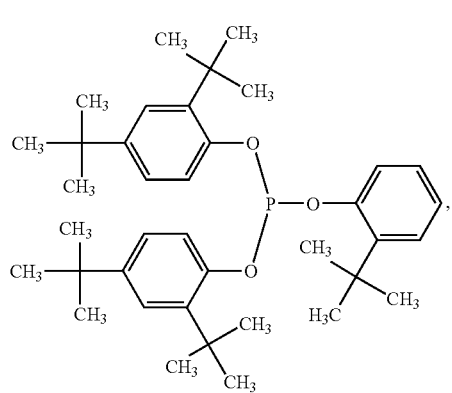
e')
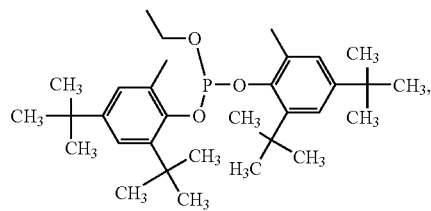
f')
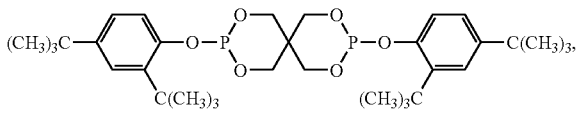

g')
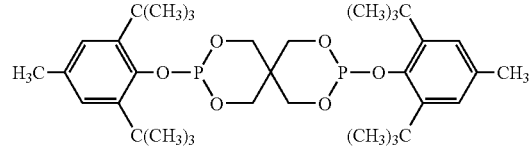
-continued
h')
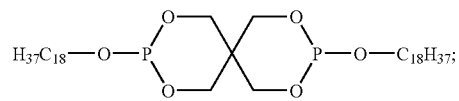
i')
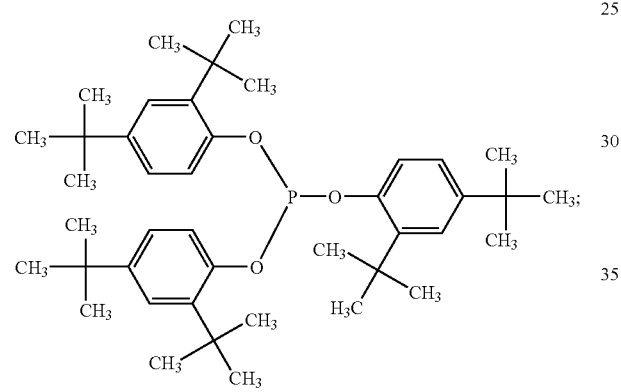
To give an example, the following compounds is commercially available as a mixture of varying composition:
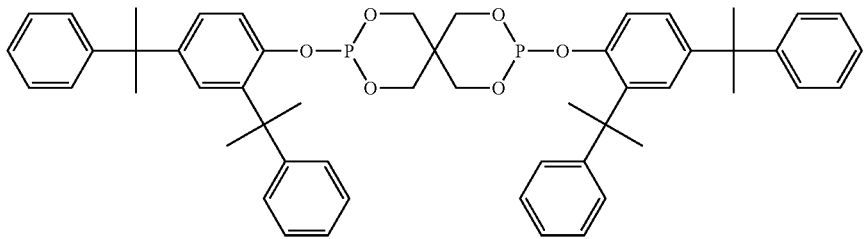
Further useful phosphite precursors include:
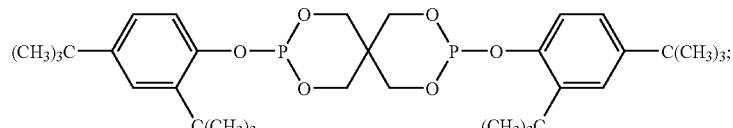
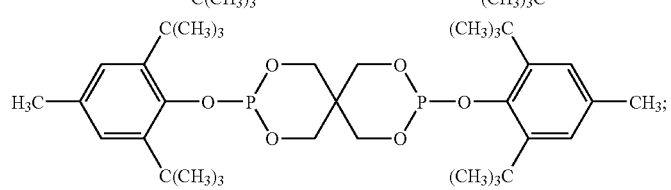  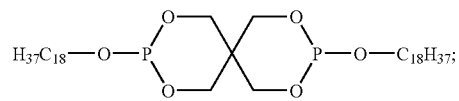
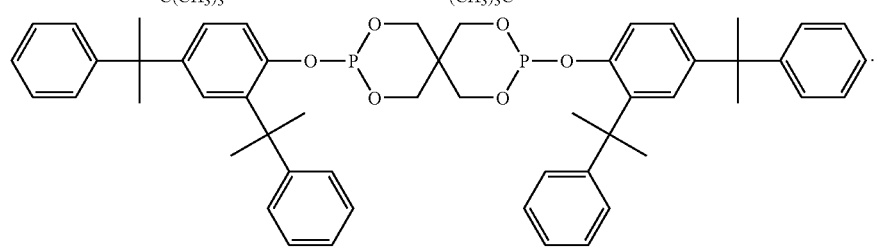

Precursor phosphites may be converted into the phosphates of present component B during a preceding oxidation step, or in situ during incorporation into the organic polymer (for example, by aerobic oxidation, or by extrusion in presence of air or another oxidative product such as a peroxide, hydroperoxide, hydrogen oxide).

The following example shows the preparation of a preferred phosphate of present component B; other phosphates may be obtained from the phosphite precursor in analogous manner.

Abbreviations used:

IPA Isopropanol; LC Liquid chromatography.

Percentages are by weight unless otherwise indicated.

PREPARATION EXAMPLE

Tris(2,4-di-tert.butylphenyl)phosphate tris(2,4-Di-tert.butylphenyl)phosphite (5146 g; Irgafos® 168, Ciba Specialty Chemicals) and isopropanol (IPA, 7890 g) are mixed in a reaction vessel and heated to 55-60° C. At this point the mixture is a slurry of approximately 39.0% solids. The peroxide (549 g, 50 weight-% solution of $H_2O_2$ in water, 1 equivalent) is added for 2-3 hours while maintaining the pot temperature (reaction is exothermic). After the peroxide addition, the mixture is maintained for 1 hour at 60° C. The reaction mass is homogeneous and the completeness of reaction is checked by LC (>97.0% conversion). Water (1355 g) is added, and the reaction mass is seeded to induce crystallization. Cooling slowly in 2 steps to 45° C. and then to 20° C. completes crystallization. The product is filtered (25μ screen), then dried at 70° C. under full vacuum with a nitrogen sweep.

Polymer Component (A)

The polymeric substrate of component (A) is of a wide variety of polymeric types including polyolefins, polystyrenes, polyesters, polyethers, polyamides, polycarbonates, and PVC. For example, the polymer substrate may be selected from the group of resins consisting of the polyolefins, the thermoplastic olefins, styrene polymers and copolymers, ABS and polymers, which contain hetero atoms, double bonds or aromatic rings. Specific embodiments are where component (A) is polypropylene (PP), polyethylene (PE), polyamide (PA), polyester, polycarbonate (PC), polyoxymethylene (POM), thermoplastic olefin (TPO), ABS or high impact polystyrene.

For example, the polymer substrate is selected from the group of resins consisting of the polyolefins, the thermoplastic olefins, styrene polymers and copolymers, and ABS.

Another embodiment of the present invention is a polymer substrate, which is selected from the group consisting of polypropylene, polyethylene, thermoplastic olefin (TPO), ABS and high impact polystyrene.

For instance, the polymer substrate is polypropylene, polyethylene or thermoplastic olefin (TPO). Organic polymers of component A are preferably thermoplastic polymers such as polyolefins like polyethylene, polypropylene or copolymers thereof. Most preferred is polypropylene.

According to a preferred embodiment the organic polymer substrate is a thermoplastic polymer selected from the group consisting of polyolefins, polystyrenes, polyesters, polyethers, polyamides and polycarbonates.

The flame-retardants of the invention are outstandingly suitable for imparting flame-retarding properties to synthetic polymers, especially thermoplastics.

Examples of such synthetic polymers are

1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultrahigh molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:

a) Radical polymerisation (normally under high pressure and at elevated temperature).

b) Catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, and amine or silyl ether groups. These catalyst systems are usually termed Phillips, Standard Oil Indiana, Ziegler-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example C$_5$-C$_9$) including hydrogenated modifications thereof (e.g. tackifiers) and mixtures of polyalkylenes and starch.

Homopolymers and copolymers from 1.-4. may have a stereo structure including syndio-tactic, isotactic, hemi-isotactic or atactic; where atactic polymers are preferred. Stereo block polymers are also included.

5. Polystyrene, poly (p-methylstyrene), poly α-methylstyrene).

6. Aromatic homopolymers and copolymers derived from vinyl aromatic monomers including styrene, α-methylstyrene, all isomers of vinyl toluene, especially p-vinyl toluene, all isomers of ethyl styrene, propyl styrene, vinyl biphenyl, vinyl naphthalene, and vinyl anthracene, and mixtures thereof. Homopolymers and copolymers may have a stereo structure including syndiotactic, isotactic, hemi-isotactic or atactic; where atactic polymers are preferred. Stereo block polymers are also included.

a) Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

b) Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

c) Hydrogenated aromatic polymers derived from hydrogenation of polymers mentioned under 6a).

Homopolymers and copolymers may have a stereo structure including syndiotactic, isotactic, hemi-isotactic or atactic; where atactic polymers are preferred. Stereo block polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulphochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1. above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes, which contain ethylene oxide as a comonomer; polyacetals modified with thermoplastic polyurethanes, acrylates or MBS.

14. Polyphenylene oxides and sulphides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as pre-cursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyether-imides, polyesteramides, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.
19. Polycarbonates and polyester carbonates.
20. Polyketones.
21. Polysulphones, polyether sulphones and polyether ketones.
22. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

Addition of Further Flame-Retardants and/or Synergists (C)

The instant invention further pertains to a flame-retardant composition, which comprises
(A) An organic polymer substrate;
And an effective flame-retarding amount of a synergistic mixture of
(B) At least one compound of formula I and/or II as defined above; and
(C) At least one compound selected from the group consisting of sterically hindered amine stabilizers, synergists, further flame-retardants, such as phosphorus containing flame-retardants, nitrogen containing flame-retardants, halogenated flame-retardants, inorganic flame-retardants.

Of special technical importance is a flame-retardant polymer composition, wherein component C comprises
At least one compound selected from the group consisting of the
(a) Sterically hindered nitroxyl stabilizers;
(b) Sterically hindered hydroxylamine stabilizers; and
(c) Sterically hindered alkoxyamine or cycloalkoxyamine stabilizers.

Flame-retardants as of present component (C) are known components (see, for example, publications initially cited), items of commerce or can be obtained by known methods.

Representative organohalogen flame-retardants are for example:
Polybrominated diphenyl oxide (DE-60F, Great Lakes Corp.), decabromodiphenyl oxide (DBDPO; SAYTEX® 102E), tris[3-bromo-2,2-bis(bromomethyl)propyl]phosphate (PB 370®, FMC Corp.), tris(2,3-dibromopropyl)phosphate, tris(2,3-dichloropropyl)phosphate, chlorendic acid, tetrachlorophthalic acid, tetrabromophthalic acid, bis-(N,N'-hydroxyethyl)tetrachlorphenylene diamine, poly-β-chloroethyl triphosphonate mixture, tetrabromobisphenol A bis(2,3-dibromopropyl ether) (PE68), brominated epoxy resin, ethylene-bis(tetrabromophthalimide) (SAYTEX® BT-93), bis(hexachlorocyclopentadieno)cyclooctane (DECLORANE PLUS®), chlorinated paraffins, octabromodiphenyl ether, hexachlorocyclopentadiene derivatives, 1,2-bis(tribromophenoxy)ethane (FF680), tetrabromo-bisphenol A (SAYTEX® RB100), ethylene bis-(dibromo-norbornanedicarboximide) (SAYTEX®BN-451), bis-(hexachlorocycloentadeno) cyclooctane, PTFE, tris-(2,3-dibromopropyl)-isocyanurate, and ethylene-bis-tetrabromophthalimide.

Suitable phosphorus containing flame-retardants are for example:
Tetraphenyl resorcinol diphosphite (FYROLFLEX® RDP, Akzo Nobel), tetrakis(hydroxymethyl)phosphonium sulphide, triphenyl phosphate, diethyl-N,N-bis(2-hydroxyethyl)-aminomethyl phosphonate, hydroxyalkyl esters of phosphorus acids, ammonium polyphosphate (APP) or (HO-STAFLAM® AP750), resorcinol diphosphate oligomer (RDP), phosphazene flame-retardants, ethylenediamine diphosphate (EDAP), phosphonates and their metal salts and phosphinates and their metal salts.

Nitrogen containing flame-retardants such as isocyanurate flame-retardants include polyisocyanurate, esters of isocyanuric acid and isocyanurates. For example, an hydroxyalkyl isocyanurate such as tris-(2-hydroxyethyl)isocyanurate, tris (hydroxymethyl)isocyanurate, tris(3-hydroxy-n-propyl)isocyanurate or triglycidyl isocyanurate.

Nitrogen containing flame-retardants include melamine based flame-retardants, examples of which are:
Melamine cyanurate, melamine borate, melamine phosphates, melamine polyphosphate, melamine pyrophosphate, melamine ammonium polyphosphate and melamine ammonium pyrophosphate.

Boric acid may be included as an additional flame-retardant.

Nitrogen-containing flame-retardants comprise compounds of formulae III to VIIIa

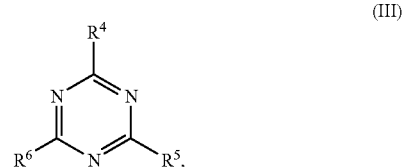

(III)

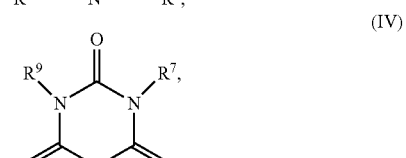

(IV)

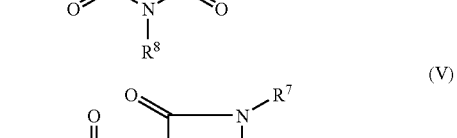

(V)

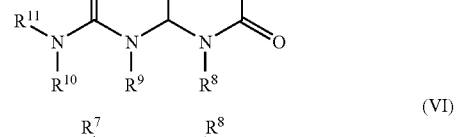

(VI)

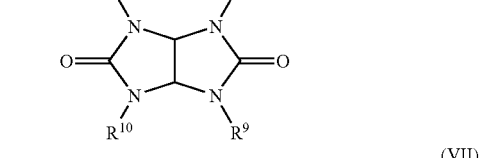

(VII)

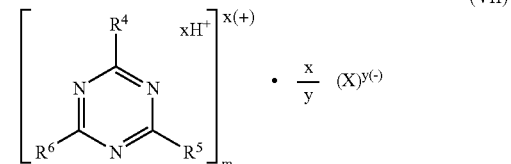

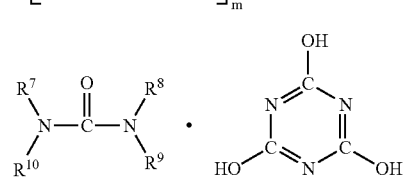

(VIII)

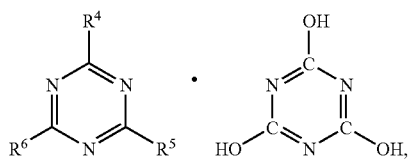

(VIIIa)

Wherein $R^4$ to $R^6$ are each independently of the others hydrogen, $C_1$-$C_8$alkyl, $C_5$-$C_6$cycloalkyl or $C_1$-$C_4$alkyl-$C_5$-$C_6$cycloalkyl, each unsubstituted or substituted by hydroxy or $C_1$-$C_4$-hydroxyalkyl; $C_2$-$C_8$alkenyl, $C_1$-$C_8$-alkoxy, -acyl, -acyloxy, $C_6$-$C_{12}$aryl, —O—$R^2$ or —N($R^2$)$R^3$, and $R^2$ and $R^3$ are hydrogen, $C_1$-$C_4$alkyl, $C_5$-$C_6$cycloalkyl, $C_2$-$C_8$alkenyl, $C_1$-$C_4$hydroxyalkyl or $C_6$-$C_{12}$aryl, with the proviso that $R^4$ to $R^6$ are not simultaneously hydrogen and also, in formula III, not simultaneously —$NH_2$, and in formula VII at least one group is present which is capable of adding a proton;

$R^7$ to $R^{11}$, each independently of the other, have the same possible meanings as $R^4$ to $R^6$ with the exception of —N($R^2$)$R^3$, X is the anion of a proton donating acid, x is the number of protons transferred from the latter to the triazine compound and y is the number of protons abstracted from the proton donating acid;

or represent ammonium polyphosphate, a melamine ammonium phosphate, a melamine ammonium polyphosphate, melamine ammonium pyrophosphate, a condensation product of melamine or/and a reaction product of melamine with phosphoric acid or/and a reaction product of a condensation product of melamine with phosphoric acid or mixtures thereof.

Examples are benzoguanamine, tris(hydroxyethyl)isocyanurate, allantoin, glycoluryl, melamine cyanurate, melamine phosphate, dimelamine phosphate, melamine pyrophosphate, urea cyanurate, melamine polyphosphate, melamine borate, ammonium polyphosphate, melamine ammonium polyphosphate or melamine ammonium pyrophosphate, preferably a condensation product of melamine from the series melem, melam, melon and/or a higher condensed compound or a reaction product of melamine with phosphoric acid and/or a reaction product of condensation products of melamine with phosphoric acid or a mixture thereof. Special emphasis should be given to: dimelamine pyrophosphate, melamine polyphosphate, melem polyphosphate, melam polyphosphate, and/or a mixed polysalt of such a type, more especially melamine polyphosphate.

Halogenated flame-retardants may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates. These components are largely known in the art, see e.g. U.S. Pat. Nos. 4,579,906 (e.g. col. 3, lines 30-41), 5,393,812; see also *Plastics Additives Handbook*, Ed. by H. Zweifel, 5th Ed., Hanser Publ., Munich 2001, pp. 681-698. Halogen contained in these compounds usually is chloro and/or bromo; preferred are brominated flame-retardants for such systems.

Phosphorus containing flame-retardant may be selected from phosphazene flame-retardants, which are well known in the art. They are disclosed for example in EP1104766, JP07292233, DE19828541, DE1988536, JP11263885, U.S. Pat. Nos. 4,107,108, 4,108,805 and 4,079,035 and 6,265,599.

The phosphorus containing flame-retardant may be selected from metal or metalloid salts of a phosphonic acid of formula X

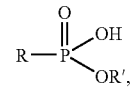

(X)

wherein R is hydrogen, $C_1$-$C_{18}$alkyl, $C_5$-$C_6$cycloalkyl, $C_2$-$C_6$alkenyl, $C_6$-$C_{10}$aryl or $C_7$-$C_{11}$aralkyl and R' is hydrogen, $C_1$-$C_8$alkyl, $C_6$-$C_{10}$aryl or $C_7$-$C_{11}$aralkyl, the substituents R and R' that are other than hydrogen being unsubstituted or substituted by halogen, hydroxyl, amino, $C_1$-$C_4$alkylamino, di-$C_1$-$C_4$alkylamino, $C_1$-$C_4$alkoxy, carboxy or $C_2$-$C_5$alkoxycarbonyl; and the metal or metalloid is from Group IA, IB, IIA, IIB, IIIA, IVA, VA or VIII of the Periodic Table. The salts may be present as simple ionic compounds comprising anions of phosphonic acid and cations of the metal or metalloid. When R' is hydrogen and the metal or metalloid has a valency of more than one, the salt can have a polymeric structure according to the following formula XI

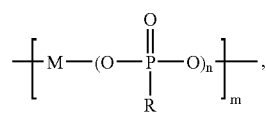

(XI)

Wherein R is as defined hereinbefore, M is a metal or metalloid, n has a value corresponding to the valency of M minus 1, m is a number from 2 to 100 and wherein each group

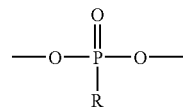

is bonded only to M atoms.

As examples of phosphonic acid salts that may be used in accordance with the invention there may be mentioned:

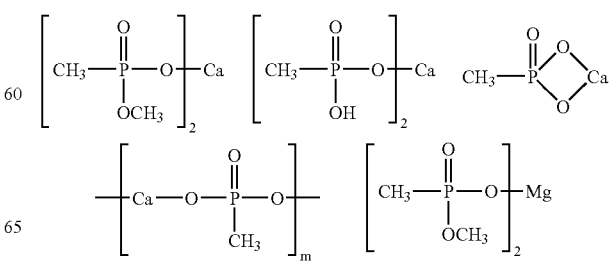

-continued

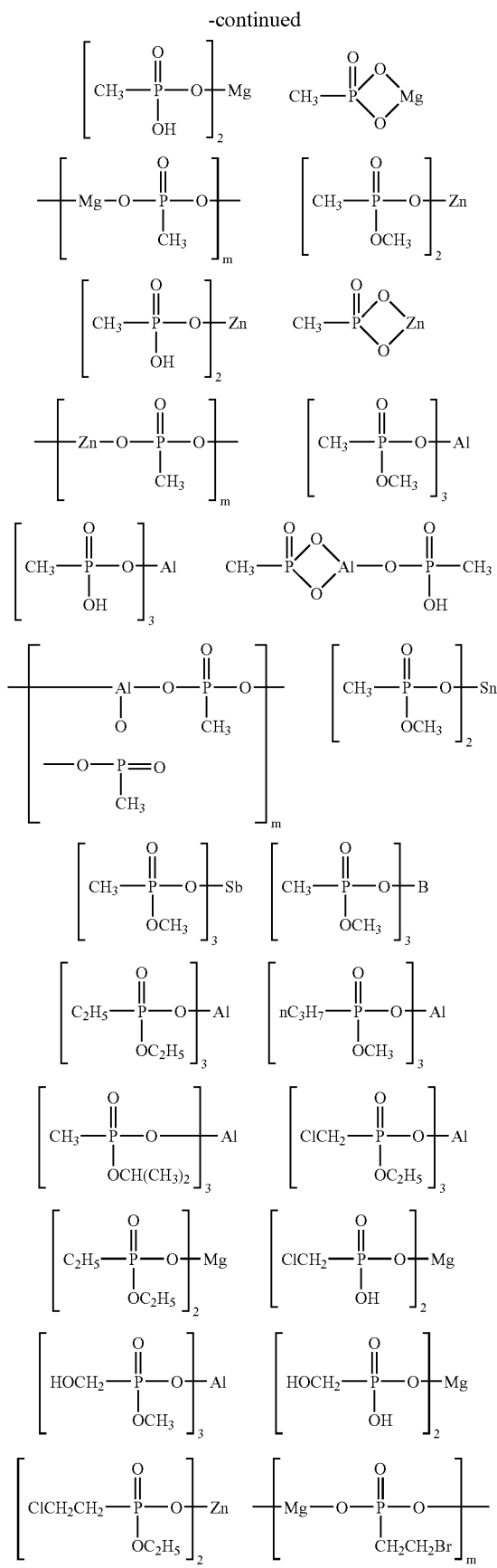
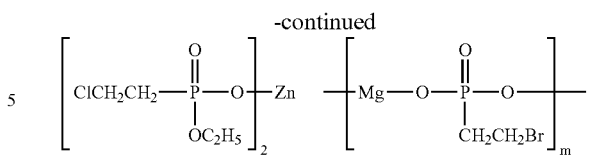

The phosphonic acid salts according to the definition either are known or can be prepared in accordance with methods known per se. Examples of such methods are to be found in, inter alia, EP-A-245 207, pages 4 and 5 to 7 (Examples 1 to 14).

PTFE, polytetrafluoroethylene (for example Teflon® 6C; E.I. Du Pont), may be advantageously added to the present compositions as an additional flame-retardant, as disclosed in WO 03/016388.

Conventional flame-retardants of the above classes are advantageously contained in the composition of the invention in an amount from about 0.5% to about 45.0% by weight of the organic polymer substrate; for instance about 3.0% to about 40.0%; for example about 5.0% to about 35.0% by weight of the polymer. For example, the flame-retardant of component (C) is employed from about 0.5% to about 10.0% by weight, from about 1.0% to about 10.0%, from about 3.0% to about 10.0% or from about 5.0% to about 10.0% by weight, based on the weight of the polymer substrate. For example, component (C) is employed from about 0.5% to about 8.0%, from about 0.5% to about 6.0%, from about 0.5% to about 5.0%, or from about 0.5% to about 3.0% by weight, based on the weight of the polymer substrate.

The compositions of this invention may further comprise acid scavengers. Acid scavengers are for example hydrotalcites and amorphous basic aluminum magnesium carbonates, such as those described in U.S. Pat. Nos. 4,427,816, 5,106,898 and 5,234,981. Hydrotalcite is also known as hycite or DHT4A.

Hydrotalcites are natural or synthetic. The natural hydrotalcite is held to possess a structure $Mg_6Al_2(OH)_{16}CO_3 \cdot 4H_2O$.

A typical empirical formula of a synthetic hydrotalcite is $Al_2Mg_{4.35}OH_{11.36}CO_{3(1.67)} \cdot x\ H_2O$.

Examples of the synthetic product include: $Mg_{0.7}Al_{0.3}(OH)_2(CO_3)_{0.15} \cdot 0.54H_2O$, $Mg_{4.5}Al_2(OH)_{13}CO_3 \cdot 3.5H_2O$ and $Mg_{4.2}Al(OH)_{12.4}CO_3$.

The acid scavengers are present in the polymeric compositions for example at a level of about 0.1% to about 1.0% by weight, based on the weight of the polymer component. For instance, the present acid scavengers are present from about 0.2% to about to about 0.8% or from about 0.4% to about 0.6% by weight, based on the weight of the polymer component. For example, the present acid scavengers are present from about 0.1% to about 0.8%, from about 0.1% to about 0.6%, from about 0.1% to about 0.4% or from about 0.1% to about 0.2% by weight based on the weight of the polymer component. For instance, the present acid scavengers are present from about 0.2% to about 1.0%, from about 0.4% to about 1.0%, from about 0.6% to about 1.0% or from about 0.8% to about 1.0% by weight based on the weight of the polymer component. The acid scavengers aid the present compositions in color, odor and stability.

The sterically hindered amine of present component (C) is preferably of the nitroxyl, hydroxylamine, alkoxyamine or hydroxyalkoxyamine class; for example containing a moiety of the partial formula

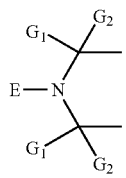

Wherein $G_1$ and $G_2$ are independently alkyl of 1 to 8 C-atoms or are together pentamethylene;

E is oxyl, hydroxyl, alkoxy, cycloalkoxy, aralkoxy, aryloxy, —O—CO—$OZ_3$, —O—Si$(Z_4)_3$, —O—PO$(OZ_5)_2$ or —O—$CH_2$—$OZ_6$ where $Z_3$, $Z_4$, $Z_5$ and $Z_6$ are selected from the group consisting of hydrogen, an aliphatic, araliphatic and aromatic moiety; or E is —O-T-$(OH)_b$;

T is a straight or branched chain alkylene of 1 to 18 C-atoms, cycloalkylene of 5 to 18 C-atoms, cycloalkenylene of 5 to 18 C-atoms, a straight or branched chain alkylene of 1 to 4 C-atoms substituted by phenyl or by phenyl substituted by one or two alkyl groups of 1 to 4 C-atoms; and b is 1, 2 or 3 with the proviso that b cannot exceed the number of C-atoms in T, and when b is 2 or 3, each hydroxyl group is attached to a different C-atoms of T.

It usually contains at least one active moiety of the partial formula

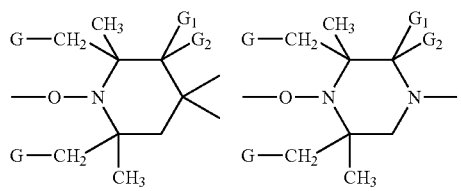

in which G is hydrogen or methyl, and $G_1$ and $G_2$, independently of one another, are hydrogen, methyl or together are a substituent =O.

Also important are compounds containing a group of the partial formula

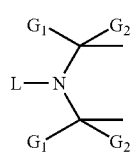

wherein $G_1$ and $G_2$ are independently alkyl of 1 to 4 C-atoms or are together pentamethylene, L is =O—, —OH or —O-$E_1$; and $E_1$ is $C_1$-$C_{18}$alkyl, $C_5$-$C_{12}$cycloalkyl or $C_7$-$C_{15}$aralkyl; or $E_1$ is $C_1$-$C_{18}$alkyl, $C_5$-$C_{12}$cycloalkyl or $C_7$-$C_{15}$aralkyl each of which is substituted in the aliphatic part by 1-3 OH groups;

or is an oligomeric or polymeric hindered amine molecule made from the reaction of a dialkyl ester or isocyanate with a compound of the formula

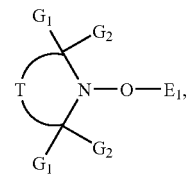

Wherein $G_1$ and $G_2$ are as defined above, and wherein $E_1$ contains 1 OH group and T is —$CH_2$—CH(OH)—$CH_2$—;

or is a simple diester or urethane derivative of a compound of the formula above wherein $E_1$ contains 1 OH group and T is —$CH_2$—CH(OH)—$CH_2$—.

The molecular weight of this component usually is in the range 170-10000 g/mol, preferably 500-5000 g/mol (number average as determined by GPC).

Conveniently employed are compounds that contain one or more of the groups of the partial formula

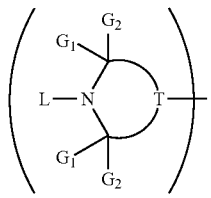

Wherein

T is a group forming a five- or six-membered ring; and

L, $G_1$ and $G_2$ are as defined above.

Two or more nitroxyl groups of the above formulae may be present in the same molecule by being linked through the T moiety as exemplified below where E is a linking group:

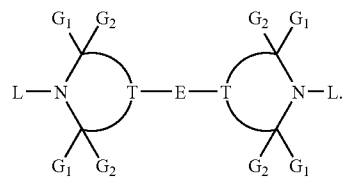

Preferably, $G_1$ and $G_2$ are each methyl.

Of special technical importance are compounds conforming to the above formula when L is O-$E_1$ and $E_1$ is methylene-OH, ethylene-OH, 2-propylene-OH or 2-methyl-2-propylene-OH.

When $E_1$ contains no OH group, it is preferably $C_1$-$C_{18}$alkyl or cyclohexyl.

When $E_1$ contains 1 OH group, it is a carbon-centered radical or diradical formed preferably from 2-methyl-2-propanol, 2-propanol, 2,2-dimethyl-1-propanol, 2-methyl-2-butanol, ethanol, 1-propanol, 1-butanol, 1-pentanol, 1-hexanol, 1-nonanol, 1-decanol, 1-dodecanol, 1-octadecanol, 2-butanol, 2-pentanol, 2-ethyl-1-hexanol, cyclohexanol, cyclooctanol, allyl alcohol, phenethyl alcohol or 1-phenyl-1-ethanol; most preferably from 2-methyl-2-propanol (=tertbutyl alcohol) or cyclohexanol.

When $E_1$ contains 2 OH groups, it is a carbon-centered radical or diradical formed preferably from 1,2-ethanediol, 1,2-propanedial, 1,3-propanediol, 1,2-butanediol, 1,3-butanediol, 1,4-butanediol, 2,2-dimethyl-1,3-propanediol, 1,2-cyclohexanediol, 1,3-cyclohexanediol or 1,4-cyclohexanediol; most preferably from 1,4-butanediol, 2,2-dimethyl-1,3-propanediol, 1,2-cyclohexanediol, 1,3-cyclohexanediol or 1,4-cyclohexanediol.

When $E_1$ contains 3 OH groups, it is a carbon-centered radical or diradical formed from glycerol, 1,1,1-tris(hydroxymethyl)methane, 2-ethyl-2-(hydroxymethyl-1,3-propanediol, 1,2,4-butanetriol or 1,2,6-hexanetriol; most preferably from glycerol, 1,1,1-tris(hydroxymethyl)methane, 2-ethyl-2-(hydroxymethyl)-1,3-propanediol.

Useful hindered amines when part of a compound of component (C) include those of the general formulae:

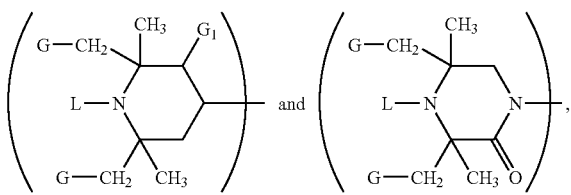

wherein L is as described above and each of G and $G_1$ is independently selected from hydrogen or methyl. Also included are amine oxides containing more than one hindered amine and more than one saturated amine oxide per molecule. Preferred are sterically hindered amines of the alkoxyamine or hydroxyalkoxyamine class, i.e. those wherein L is —O-$E_1$.

More preferably, sterically hindered amine compounds of present component (C) conform to the formulae and compounds as described below under groups a') to m').

a') A compound of the formula

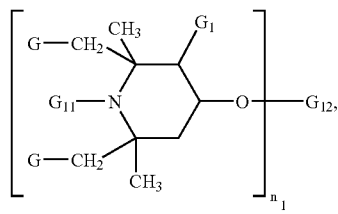

in which $n_1$ is a number from 1 to 4, G and $G_1$, independently of one another, are hydrogen or methyl, $G_{11}$ is O, hydroxyl, $C_1$-$C_{18}$alkoxy, $C_5$-$C_{12}$cycloalkoxy, $C_7$-$C_{15}$phenylalkoxy; or $G_{11}$ is $C_1$-$C_{18}$alkoxy, $C_5$-$C_{12}$cycloalkoxy or $C_7$-$C_{15}$phenylalkoxy each of which is substituted in the aliphatic part by 1-3 OH groups; $G_{11}$ preferably being $C_1$-$C_{12}$alkoxy or cyclohexyloxy or $C_2$-$C_8$hydroxyalkoxy, especially octyloxy, cyclohexyloxy or 2-hydroxy-2-methylpropoxy, and $G_{12}$, if $n_1$ is 1, is hydrogen, $C_1$-$C_{18}$alkyl which is uninterrupted or interrupted by one or more oxygen atoms, COO and/or CONH groups, or is cyanoethyl, benzoyl, glycidyl, a monovalent radical of an aliphatic, cycloaliphatic, araliphatic, unsaturated or aromatic carboxylic acid, carbamic acid or phosphorus-containing acid or a monovalent silyl radical, preferably a radical of an aliphatic carboxylic acid having 2 to 18 C-atoms, of a cycloaliphatic carboxylic acid having 7 to 15 C-atoms, or an α,β-unsaturated carboxylic acid having 3 to 5 C-atoms or of an aromatic carboxylic acid having 7 to 15 C-atoms, where each carboxylic acid can be substituted in the aliphatic, cycloaliphatic or aromatic moiety by 1 to 3-COO$Z_{12}$ groups, in which $Z_{12}$ is H, $C_1$-$C_{20}$alkyl, $C_3$-$C_{12}$alkenyl, $C_5$-$C_7$cycloalkyl, phenyl or benzyl, $G_{12}$, if $n_1$ is 2, is $C_2$-$C_{12}$alkylene, $C_4$-$C_{12}$alkenylene, xylylene, a divalent radical of an aliphatic, cycloaliphatic, araliphatic or aromatic dicarboxylic acid, dicarbamic acid or phosphorus-containing acid or a divalent silyl radical, preferably a radical of an aliphatic dicarboxylic acid having 2 to 36 C-atoms, or a cycloaliphatic or aromatic dicarboxylic acid having 8-14 C-atoms or of an aliphatic, cycloaliphatic or aromatic dicarbamic acid having 8-14 C-atoms, where each dicarboxylic acid may be substituted in the aliphatic, cycloaliphatic or aromatic moiety by one or two —COO$Z_{12}$ groups, $G_{12}$, if $n_1$ is 3, is a trivalent radical of an aliphatic, cycloaliphatic or aromatic tricarboxylic acid, which may be substituted in the aliphatic, cycloaliphatic or aromatic moiety by —COO$Z_{12}$, of an aromatic tricarbamic acid or of a phosphorus-containing acid, or is a trivalent silyl radical, preferred radicals including triacyl radicals of nitrilo triacetic acid of benzene tricarboxylic acid, and $G_{12}$, if $n_1$ is 4, is a tetravalent radical of an aliphatic, cycloaliphatic or aromatic tetracarboxylic acid.

The carboxylic acid radicals mentioned above mean radicals of the partial formula (—CO)$_x$R, where x is as defined above for $n_1$, and the meaning of R arises from the definition given above.

Alkyl with up to 20 C-atoms is, for example, methyl, ethyl, n-propyl, n-butyl, sec-butyl, tertbutyl, n-hexyl, n-octyl, 2-ethylhexyl, n-nonyl, n-decyl, n-undecyl, n-dodecyl, n-tridecyl, n-tertradecyl, n-hexadecyl or n-octadecyl.

$C_1$-$C_{18}$Alkoxy $G_{11}$ is, for example, methoxy, ethoxy, propoxy, isopropoxy, butoxy, isobutoxy, pentyloxy, isopentyloxy, hexyloxy, heptyloxy, octyloxy, decyloxy, dodecyloxy, tetradecyloxy, hexadecyloxy and octadecyloxy. $C_6$-$C_{12}$alkoxy, in particular heptyloxy and octyloxy, is preferred.

$C_5$-$C_{12}$Cycloalkoxy $G_{11}$ is, for example, cyclopentyloxy, cyclohexyloxy, cycloheptyloxy, cyclooctyloxy, cyclodecyloxy and cyclododecyloxy. $C_5$-$C_8$cycloalkoxy, in particular cyclopentyloxy and cyclohexyloxy, is preferred.

$C_7$-$C_9$Phenylalkoxy is, for example, benzyloxy.

$G_{11}$ as $C_1$-$C_{18}$Alkoxy, $C_5$-$C_{12}$cycloalkoxy or $C_7$-$C_{15}$phenylalkoxy substituted in the aliphatic part by 1-3 OH groups is a radical formed by abstraction of an carbon-bonded hydrogen atom preferably from 2-methyl-2-propanol (tert-butanol), 2-propanol, 2,2-dimethyl-1-propanol, 2-methyl-2-butanol, ethanol, 1-propanol, 1-butanol, 1-pentanol, 1-hexanol, 1-nonanol, 1-decanol, 1-dodecanol, 1-octadecanol, 2-butanol, 2-pentanol, 2-ethyl-1-hexanol, cyclohexanol, cyclooctanol, allyl alcohol, phenethyl alcohol or 1-phenyl-1-ethanol; 1,2-ethanediol, 1,2-propanedial, 1,3-propanediol, 1,2-butanediol, 1,3-butanediol, 1,4-butanediol, 2,2-dimethyl-1,3-propanediol, 1,2-cyclohexanediol, 1,3-cyclohexanediol or 1,4-cyclohexanediol; glycerol, 1,1,1-tris(hydroxymethyl)methane, 2-ethyl-2-(hydroxymethyl-1,3-propanediol, 1,2,4-butanetriol or 1,2,6-hexanetriol.

More preferably, $G_{11}$ is are formed from 2-methyl-2-propanol or cyclohexanol, 1,4-butanediol, 2,2-dimethyl-1,3-propanediol, 1,2-cyclohexanediol, 1,3-cyclohexanediol or 1,4-cyclohexanediol. Most preferred hydroxy substituted $G_{11}$ is 2-hydroxy-2-methylpropoxy.

Examples of several $G_{12}$ radicals are given below.

If $G_{12}$ is a monovalent radical of a carboxylic acid, it is, for example, an acetyl, caproyl, stearoyl, acryloyl, methacryloyl, benzoyl or β-(3,5-di-tert-butyl-4-hydroxyphenyl)propionyl radical.

If $G_{12}$ is a monovalent silyl radical, it is, for example, a radical of the partial formula —$(C_jH_{2j})$—Si(Z')$_2$Z", in which j is an integer in the range from 2 to 5, and Z' and Z", independently of one another, are $C_1$-$C_4$alkyl or $C_1$-$C_4$alkoxy.

If $G_{12}$ is a divalent radical of a dicarboxylic acid, it is, for example, a malonyl, succinyl, glutaryl, adipoyl, suberoyl, sebacoyl, maleoyl, itaconyl, phthaloyl, dibutylmalonyl, dibenzylmalonyl, butyl(3,5-di-tert-butyl-4-hydroxybenzyl)malonyl or bicycloheptenedicarbonyl radical or a group of the partial formula

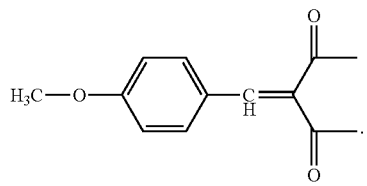

If $G_{12}$ is a trivalent radical of a tricarboxylic acid, it is, for example, a trimellitoyl, citryl or nitrilotriacetyl radical.

If $G_{12}$ is a tetravalent radical of a tetracarboxylic acid, it is, for example, the tetravalent radical of butane-1,2,3,4-tetracarboxylic acid or of pyromellitic acid.

If $G_{12}$ is a divalent radical of a dicarbamic acid, it is, for example, hexamethylenedicarbamoyl or 2,4-toluoylenedicarbamoyl radical.

Preference is given to compounds, in which G and $G_1$ are hydrogen, $G_{11}$ is hydrogen or methyl, $n_1$ is 2 and $G_{12}$ is the diacyl radical of an aliphatic dicarboxylic acid having 4-12 C-atoms.

b') A compound of the formula

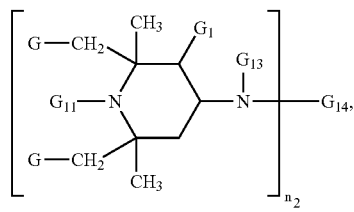

in which $n_2$ is the number 1, 2 or 3, and G, $G_1$ and $G_{11}$ are as defined under a'), $G_{13}$ is hydrogen, $C_1$-$C_{12}$alkyl, $C_2$-$C_5$hydroxyalkyl, $C_5$-$C_7$cycloalkyl, $C_7$-$C_8$aralkyl, $C_1$-$C_{18}$alkanoyl, $C_3$-$C_5$alkenoyl, benzoyl or a group of the partial formula

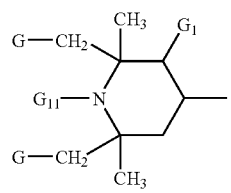

and, if $n_2$ is 1, $G_{14}$, is hydrogen, $C_1$-$C_{18}$alkyl, $C_3$-$C_8$alkenyl, $C_5$-$C_7$cycloalkyl, $C_1$-$C_4$alkyl which is substituted by a hydroxyl, cyano, alkoxycarbonyl or carbamide group or group of the partial formula —CONH—Z, or $G_{14}$ is glycidyl, a group of the partial formula —$CH_2$—CH(OH)-Z or of the partial formula —CONH—Z, in which Z is hydrogen, methyl or phenyl or $CH_2$—$OZ_{14}$ with $Z_{14}$ being hydrogen or $C_1$-$C_{18}$alkyl; or if $n_2$ is 2, $G_{14}$ is $C_2$-$C_{12}$alkylene, $C_6$-$C_{12}$arylene, xylylene, a —$CH_2$—CH(OH)—$CH_2$ group or a —$CH_2$—CH(OH)—$CH_2$—O-D-O— group, in which D is $C_2$-$C_{10}$alkylene, $C_6$-$C_{15}$arylene, $C_6$-$C_{12}$cycloalkylene, or, provided that $G_{13}$ is not alkanoyl, alkenoyl or benzoyl, $G_{14}$ can alternatively be 1-oxo-$C_2$-$C_{12}$alkylene, a divalent radical of an aliphatic, cycloaliphatic or aromatic dicarboxylic acid or dicarbamic acid or alternatively the group —CO—; or if $n_2$ is 3, $G_{14}$, is a group

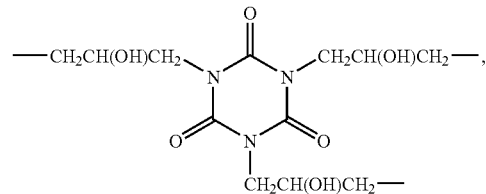

or, if $n_2$ is 1, $G_{13}$ and $G_{14}$ together can be the divalent radical of an aliphatic, cycloaliphatic or aromatic 1,2- or 1,3-dicarboxylic acid.

Some examples for the radicals $G_{13}$, $G_{14}$ and D are given below. Alkyl substituents are as defined above for a').

$C_5$-$C_7$Cycloalkyl substituents are, in particular, cyclohexyl.

$C_7$-$C_8$Aralkyl $G_{13}$ is, in particular, phenethyl or especially benzyl.

$C_2$-$C_5$Hydroxyalkyl $G_{13}$ is, in particular, 2-hydroxyethyl or 2-hydroxypropyl.

$C_1$-$C_{18}$Alkanoyl $G_{13}$ is, for example, formyl, acetyl, propionyl, butyryl, octanoyl, dodecanoyl, hexadecanoyl, octadecanoyl, but preferably acetyl, and $C_3$-$C_5$alkenoyl $G_{13}$ is, in particular, acryloyl.

$C_2$-$C_8$Alkenyl $G_{14}$ is, for example, allyl, methallyl, 2-butenyl, 2-pentenyl, 2-hexenyl or 2-octenyl.

$G_{14}$ as hydroxyl-, cyano-, alkoxycarbonyl- or carbamide-substituted $C_1$-$C_4$alkyl can be, for example, 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

$C_2$-$C_{12}$Alkylene radicals are, for example, ethylene, propylene, 2,2-dimethylpropylene, tetramethylene, hexamethylene, octamethylene, decamethylene or dodecamethylene.

$C_6$-$C_{15}$Arylene substituents are, for example, o-, m- or p-phenylene, 1,4-naphthylene or 4,4-diphenylene.

$C_6$-$C_{12}$Cycloalkylene is, in particular, cyclohexylene.

$G_{14}$ as 1-oxo-$C_2$-$C_{12}$alkylene is preferably a group

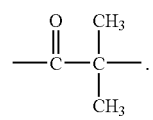

c') A compound of the formula

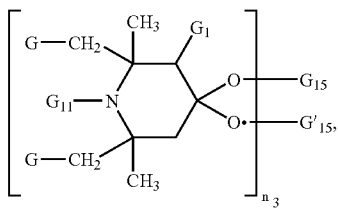

in which $n_3$ is the number 1 or 2, G, $G_1$ and $G_{11}$ are as defined under a'), and $G_{15}$ and $G'_{15}$ if $n_3$ is 1, are independently $C_1$-$C_{12}$alkyl, $C_2$-$C_{12}$alkenyl, $C_7$-$C_{12}$aralkyl, or $G_{15}$ is also hydrogen, or $G_{15}$ and $G'_{15}$ together are $C_2$-$C_8$alkylene, $C_5$-$C_{15}$alkenylene, $C_2$-$C_8$hydroxyalkylene or $C_4$-$C_{22}$acyloxyalkylene, and if $n_3$ is 2, $G_{15}$ and $G'_{15}$ together are the (—CH$_2$)$_2$C(CH$_2$—)$_2$ group.

$C_2$-$C_8$Alkylene or $C_2$-$C_8$hydroxyalkylene $G_{15}$ and $G'_{15}$ are, for example, ethylene, 1-methylethylene, propylene, 2-ethylpropylene or 2-ethyl-2-hydroxymethylpropylene.

$C_4$-$C_{22}$Acyloxyalkylene $G_{15}$ and $G'_{15}$ is, for example, 2-ethyl-2-acetoxymethylpropylene.

d') A compound of the formula:

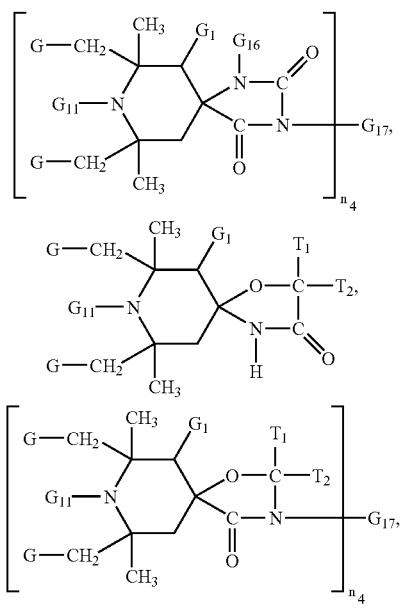

in which $n_4$ is the number 1 or 2, G, $G_1$ and $G_{11}$ are as defined under a'), $G_{16}$ is hydrogen, $C_1$-$C_{12}$alkyl, allyl, benzyl, glycidyl or $C_2$-$C_6$alkoxyalkyl, and $G_{17}$, if $n_4$ is 1, is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl or a group of the partial formula —(CH$_2$)$_p$—COO-Q or —(CH$_2$)$_p$—O—CO-Q, in which p is 1 or 2, and Q is $C_1$-$C_4$alkyl or phenyl, and $G_{17}$, if $n_4$ is 2, is $C_2$-$C_{12}$alkylene, $C_4$-$C_{12}$alkenylene, $C_6$-$C_{12}$arylene, a group of the partial formula —CH$_2$—CH(OH)—CH$_2$—O-D'-O—CH$_2$—CH (OH)—CH$_2$—, in which D' is $C_2$-$C_{10}$alkylene, $C_6$-$C_{15}$arylene or $C_6$-$C_{12}$cycloalkylene, or a group of the partial formula —CH$_2$CH(OD")CH$_2$—(OCH$_2$—CH(OD") CH$_2$)$_2$—, in which D" is hydrogen, $C_1$-$C_{18}$alkyl, allyl, benzyl, $C_2$-$C_{12}$alkanoyl or benzoyl, $T_1$ and $T_2$, independently of one another, are hydrogen, $C_1$-$C_{18}$alkyl or unsubstituted or halogen- or $C_1$-$C_4$alkyl-substituted $C_6$-$C_{10}$aryl or $C_7$-$C_9$aralkyl, or $T_1$ and $T_2$ together with the carbon atom bonding them form a $C_5$-$C_{14}$cycloalkane ring.

$C_1$-$C_{12}$alkyl substituents are, for example, methyl, ethyl, n-propyl, n-butyl, sec-butyl, tert-butyl, n-hexyl, n-ocyl, 2-ethylhexyl, n-nonyl, n-decyl, n-undecyl or n-dodecyl.

$C_1$-$C_{18}$Alkyl substituents can be, for example, the abovementioned groups and in addition, for example, n-tridecyl, n-tetradecyl, n-hexadecyl or n-octadecyl.

$C_2$-$C_6$Alkoxyalkyl substituents are, for example, methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$C_3$-$C_5$Alkenyl $G_{17}$ is, for example, 1-propenyl, allyl, methallyl, 2-butenyl or 2-pentenyl.

$C_7$-$C_9$Aralkyl $G_{17}$, $T_1$ and $T_2$ are, in particular, phenethyl or especially benzyl. If $T_1$ and $T_2$ together with the carbon atom form a cycloalkane ring, this can be, for example, a cyclopentane, cyclohexane, cyclooctane or cyclododecane ring.

$C_2$-$C_4$Hydroxyalkyl $G_{17}$ is, for example, 2-hydroxyethyl, 2-hydroxypropyl, 2-hydroxybutyl or 4-hydroxybutyl.

$C_6$-$C_{10}$Aryl $G_{17}$, $T_1$ and $T_2$ are, in particular, phenyl or α- or β-naphthyl, which are unsubstituted or substituted by halogen or $C_1$-$C_4$alkyl.

$C_2$-$C_{12}$Alkylene $G_{17}$ is, for example, ethylene, propylene, 2,2-dimethylpropylene, tetramethylene, hexamethylene, octamethylene, decamethylene or dodecamethylene.

$C_4$-$C_{12}$Alkenylene $G_{17}$ is, in particular, 2-butenylene, 2-pentenylene or 3-hexenylene.

$C_6$-$C_{12}$arylene $G_{17}$ is, for example, o-, m- or p-phenylene, 1,4-naphthylene or 4,4'-diphenylene.

$C_2$-$C_{12}$Alkanoyl D" is, for example, propionyl, butyryl, octanoyl, dodecanoyl, but preferably acetyl.

$C_2$-$C_{10}$Alkylene, $C_6$-$C_{15}$arylene or $C_6$-$C_{12}$cycloalkylene D' have, for example, one of the definitions given for D under (b').

e') A compound of the formula

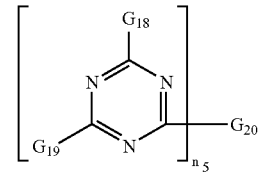

in which $n_5$ is the number 1 or 2, and $G_{18}$ is a group of the partial formula

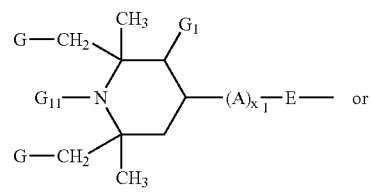

-continued

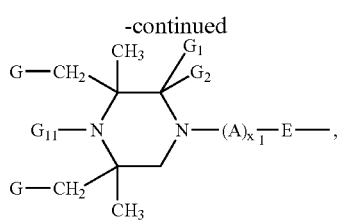

in which G and $G_{11}$ are as defined under a'), and $G_1$ and $G_2$ are hydrogen, methyl or, together, are a substituent =O, E is —O— or —ND'''-, A is $C_2$-$C_6$alkylene or —(CH$_2$)$_3$—O— and $x_1$ is the number 0 or 1, D''' is hydrogen, $C_1$-$C_{12}$alkyl, $C_2$-$C_{12}$alkylene-N(D$^V$)$_2$, $C_2$-$C_5$hydroxyalkyl or $C_5$-$C_7$cycloalkyl, where D$^V$, independently, is hydrogen or butyl, $G_{19}$ is identical to $G_{18}$ or is one of the groups —N($G_{21}$)($G_{22}$), —O$G_{23}$, —N(H)(CH$_2$O$G_{23}$) or —N(CH$_2$O$G_{23}$)$_2$, $G_{20}$, if $n_5$=1, is identical to $G_{18}$ or $G_{19}$ and, if $n_5$=2, is an -E-D$^{IV}$-E-group, in which D$^{IV}$ is $C_2$-$C_8$alkylene or $C_2$-$C_8$alkylene, which is interrupted by 1 or 2-N$G_{21}$-groups, $G_{21}$ is hydrogen, $C_1$-$C_{12}$alkyl, cyclohexyl, benzyl or $C_1$-$C_4$-hydroxyalkyl or a group of the formula

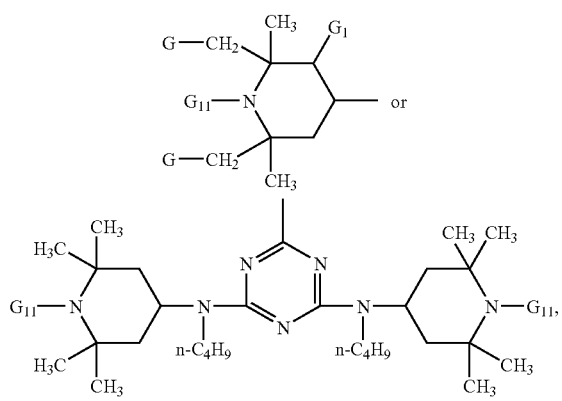

$G_{22}$ is $C_1$-$C_{12}$alkyl, cyclohexyl, benzyl or $C_1$-$C_4$hydroxyalkyl, and $G_{23}$ is hydrogen, $C_1$-$C_{12}$alkyl or phenyl, or $G_{21}$ and $G_{22}$ together are $C_4$-$C_5$alkylene or $C_4$-$C_5$oxyalkylene, for example, —CH$_2$CH$_2$—O—CH$_2$CH$_2$—, or a group of the partial formula —CH$_2$CH$_2$—N($G_{11}$)-CH$_2$CH$_2$—.

Some examples of substituents in the compounds according to Group e') are given below.

$C_1$-$C_{12}$Alkyl substituents are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Hydroxyalkyl substituents are, for example, 2-hydroxyethyl, 2-hydroxypropyl, 3-hydroxypropyl, 2-hydroxybutyl or 4-hydroxybutyl.

$C_5$-$C_7$Cycloalkyl substituents are, for example, cyclopentyl, cyclohexyl or cycloheptyl. Cyclohexyl is preferred.

$C_2$-$C_6$Alkylene A is, for example, ethylene, propylene, 2,2-dimethylpropylene, tetramethylene or hexamethylene.

If $G_{21}$ and $G_{22}$ together are $C_4$-$C_5$alkylene or oxyalkylene, they are, for example, tetramethyllene, pentamethylene or 3-oxapentamethylene.

f') A compound of the formula

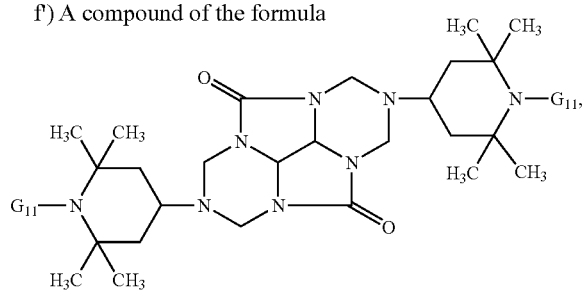

wherein $G_{11}$ is as defined under a').

g') Oligomeric or polymeric compounds whose recurring structural unit contains a 2,2,6,6-tetraalkylpiperidinyl radical, in particular polyesters, polyethers, polyamides, polyamines, polyurethanes, polyureas, polyaminotriazines, poly(meth)acrylates, poly(meth)acrylamides and copolymers thereof which contain such radicals.

Examples of 2,2,6,6-polyalkylpiperidine compounds from this class are the compounds of the following formulae. $m_1$ to $m_{14}$ is a number from 2 to about 200, preferably 2 to 100, for example 2 to 50, 2 to 40, 3 to 40 or 4 to 10.

The meanings of the end groups, which saturate the free valences in the oligomeric or polymeric compounds listed below depend on the processes used for the preparation of said compounds. The end groups can also in addition be modified after the synthesis of the compounds.

Examples for polymeric compounds are:

1) A compound of the formula

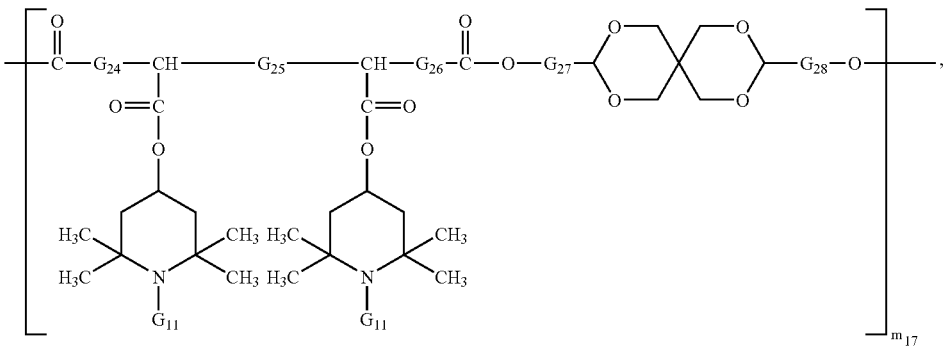

wherein $G_{24}$, $G_{25}$, $G_{26}$, $G_{27}$ and $G_{28}$, independently of one another, are a direct bond or $C_1$-$C_{10}$alkylene, $G_{11}$ is as defined under a') and $m_{17}$ is a number from 1 to 50.

In this compound the end group bonded to the >C=O group can be, for example,

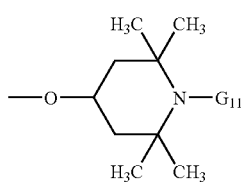

and the end group bonded to the oxygen can be, for example

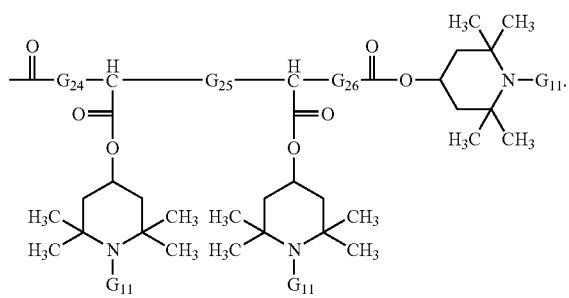

2) A compound of the formula

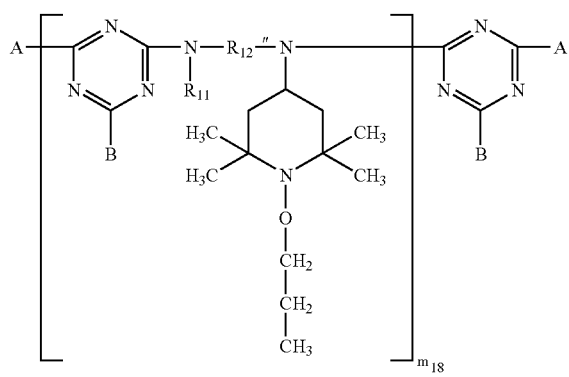

in which the index $m_{18}$ is a numeral from 1 to 15;

$R_{12}$ is $C_2$-$C_{12}$alkylene, $C_4$-$C_{12}$alkenylene, $C_5$-$C_7$cycloalkylene, $C_5$-$C_7$cycloalkylene-di($C_1$-$C_4$alkylene), $C_1$-$C_4$alkylenedi($C_5$-$C_7$cycloalkylene), phenylenedi($C_1$-$C_4$alkylene) or $C_4$-$C_{12}$alkylene interrupted by 1,4-piperazinediyl, —O— or >N—$X_1$ with $X_1$ being $C_1$-$C_{12}$acyl or ($C_1$-$C_{12}$alkoxy)carbonyl or having one of the definitions of $R_{14}$ given below except hydrogen; or $R_{12}$ is a group of the partial formulae:

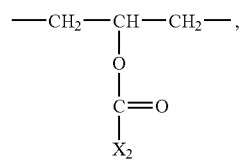

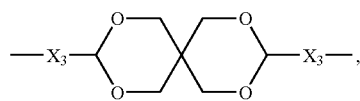

wherein $X_2$ represents $C_1$-$C_{18}$alkyl, $C_5$-$C_{12}$cycloalkyl which is unsubstituted or substituted by 1, 2 or 3, $C_1$-$C_4$alkyl, phenyl which is unsubstituted or substituted by 1, 2 or 3 $C_1$-$C_4$alkyl or $C_1$-$C_4$alkoxy, $C_7$-$C_9$phenylalkyl which is unsubstituted or substituted on the phenyl by 1, 2 or 3 $C_1$-$C_4$alkyl;

the radicals $X_3$ being independently of one another represent $C_2$-$C_{12}$alkylene;

the radicals A are independently of one another —$OR_{13}$, —$N(R_{14})(R_{15})$ or a group of the partial formula

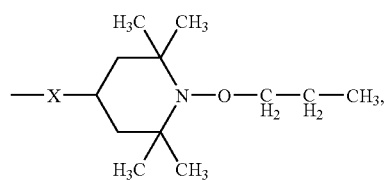

$R_{13}$, $R_{14}$ and $R_{15}$, which are identical or different, are hydrogen, $C_1$-$C_{18}$alkyl, $C_5$-$C_{12}$cycloalkyl which is unsubstituted or substituted by 1, 2 or 3 $C_1$-$C_4$alkyl; $C_3$-$C_{18}$alkenyl, phenyl which is unsubstituted or substituted by 1, 2 or 3 $C_1$-$C_4$alkyl or $C_1$-$C_4$alkoxy; $C_7$-$C_9$phenylalkyl which is unsubstituted or substituted on the phenyl by 1, 2 or 3 $C_1$-$C_4$alkyl; tetrahydrofurfuryl or $C_2$-$C_4$alkyl which is substituted in the 2, 3 or 4 position by —OH, $C_1$-$C_8$alkoxy, di($C_1$-$C_4$alkyl)amino or a group of the partial formula:

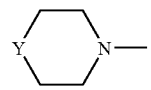

Wherein Y represents —O—, —$CH_2$—, —$CH_2CH_2$— or >N—$CH_3$;

or —$N(R_{14})(R_{15})$ is additionally a group of the partial formula below;

X is —O— or >N—$R_{16}$;

$R_{16}$ is hydrogen, $C_1$-$C_{18}$alkyl, $C_3$-$C_{18}$alkenyl, $C_5$-$C_{12}$cycloalkyl which is unsubstituted or substituted by 1, 2 or 3 $C_1$-$C_4$alkyl; $C_7$-$C_9$phenylalkyl which is unsubstituted or substituted on the phenyl by 1, 2 or 3 $C_1$-$C_4$alkyl; tetrahydrofurfuryl, a group of the partial formula (2g$^{v}$),

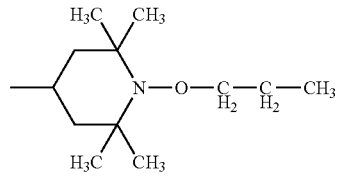

or $C_2$-$C_4$alkyl which is substituted in the 2, 3 or 4 position by —OH, $C_1$-$C_8$alkoxy, di($C_1$-$C_4$alkyl)amino or represents a group of the partial formula above;

$R_{11}$ has one of the definitions given for $R_{16}$; and the radicals B have independently of one another one of the definitions given for the above compounds, such as the ones described in U.S. Pat. No. 6,117,995.

3) A compound of the formula

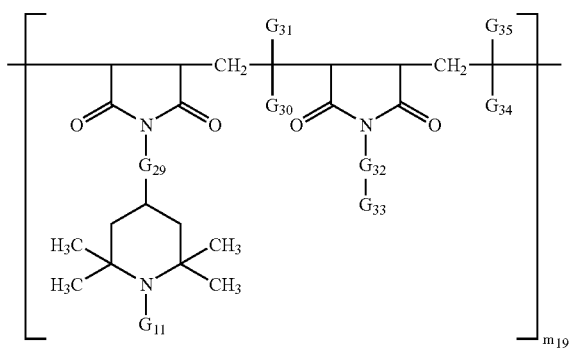

in which $G_{11}$ is as defined under a'), $G_{29}$ and $G_{32}$, independently of one another, are a direct bond or a —N($X_1$)—CO—$X_2$—CO—N($X_3$)— group, where $X_1$ and $X_3$, independently of one another, are hydrogen, $C_1$-$C_8$alkyl, $C_5$-$C_{12}$cycloalkyl, phenyl, $C_7$-$C_9$phenylalkyl or a group of the partial formula

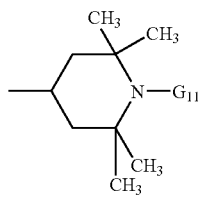

and $X_2$ is a direct bond or $C_1$-$C_4$alkylene, $G_{30}$, $G_{31}$, $G_{34}$ and $G_{35}$, independently of one another, are hydrogen, $C_1$-$C_{30}$alkyl, $C_5$-$C_{12}$cycloalkyl or phenyl, $G_{33}$ is hydrogen, $C_1$-$C_{30}$alkyl, $C_5$-$C_{12}$cycloalkyl, $C_7$-$C_9$phenylalkyl, phenyl or a group of the above partial formula and $m_{19}$ is a number from 1 to 50.

In the compounds of Group 3), the end group bonded to the 2,5-dioxopyrrolidine ring can be, for example, hydrogen, and the end group bonded to the —C($G_{34}$)($G_{35}$)-radical can be, for example,

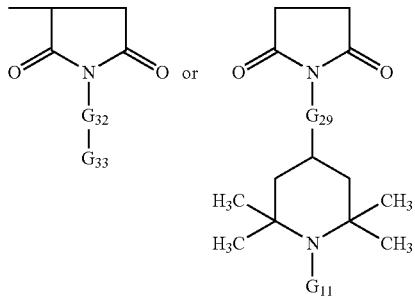

4) A product obtainable by reacting an intermediate product, obtained by reaction of a polyamine of the formula

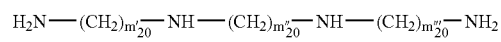

with cyanuric chloride, with a compound of the formula

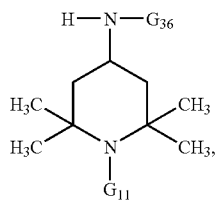

in which m'$_{20}$, m"$_{20}$ and m'"$_{20}$, independently of one another, are a number from 2 to 12, $G_{36}$ is hydrogen, $C_1$-$C_{12}$alkyl, $C_5$-$C_{12}$cycloalkyl, phenyl or $C_7$-$C_9$phenylalkyl, and $G_{11}$ is as defined under Group a').

In general, the above reaction product can be represented for example by a compound of the following 3 formulae. It can also be in the form of a mixture of these three compounds:

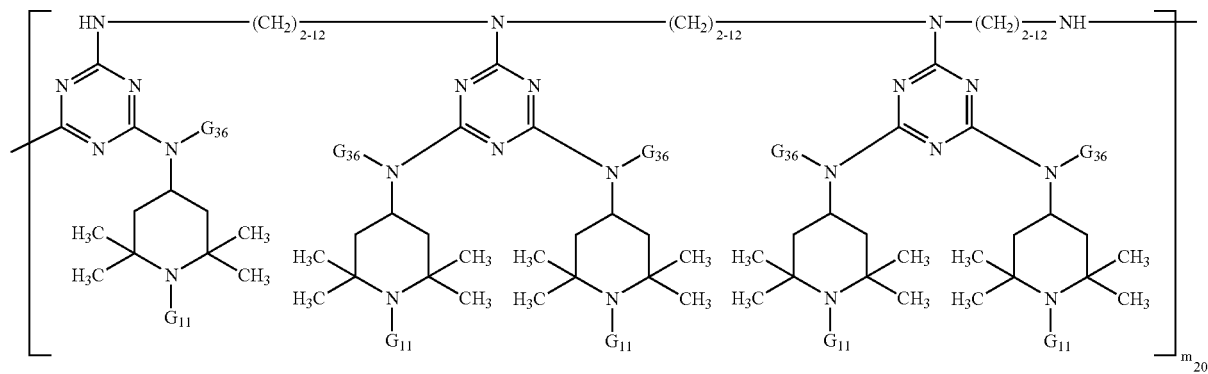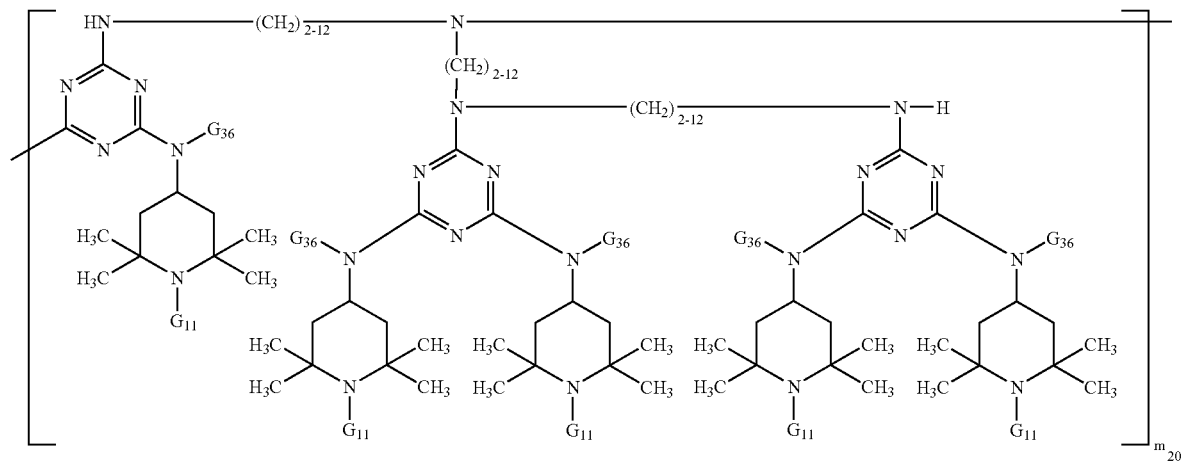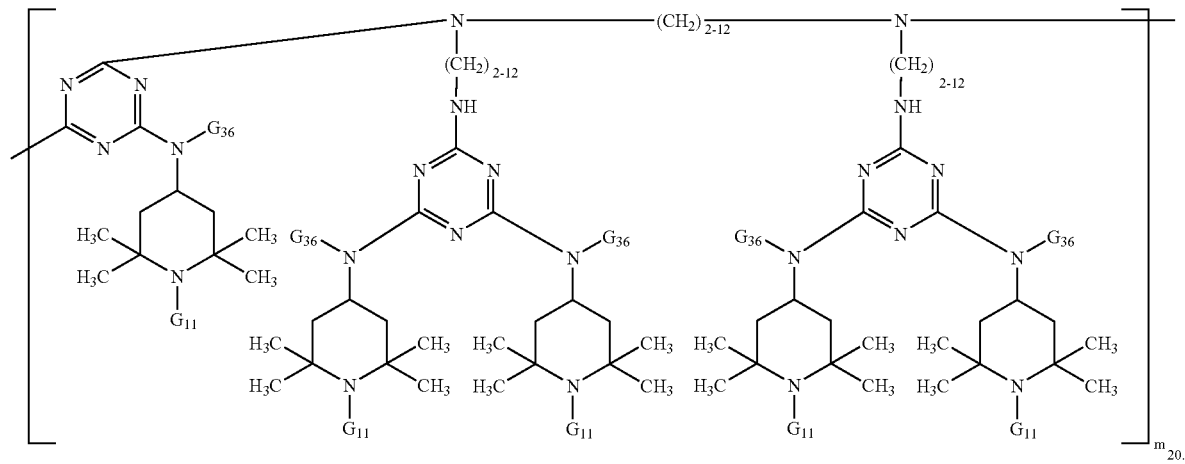

5) A compound of the formula

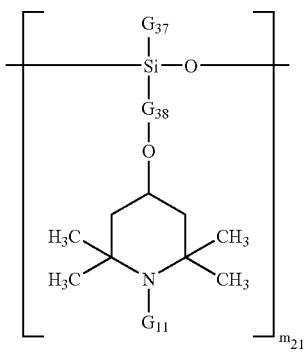

in which $G_{11}$ is as defined under (a'), $G_{37}$ is $C_1$-$C_{10}$alkyl, $C_5$-$C_{12}$cycloalkyl, $C_1$-$C_4$alkyl-substituted $C_5$-$C_{12}$cycloalkyl, phenyl or $C_1$-$C_{10}$alkyl-substituted phenyl, $G_{38}$ is $C_3$-$C_{10}$alkylene and $m_{21}$ is a number from 1 to 50.

In the compounds of the formula above, the terminal group bonded to the silicon atom can be, for example, $(G_{37})_3Si$—O—, and the terminal group bonded to the oxygen can be, for example, —$Si(G_{37})_3$.

The compounds of the formula above can also be in the form of cyclic compounds if $m_{21}$ is a number from 3 to 10, i.e. the free valences shown in the structural formula then form a direct bond.

6) A compound of the formula

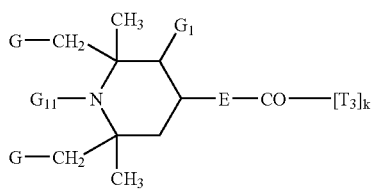

Where E is —O— or —ND'''— as defined under (e'), $T_3$ is ethylene or 1,2-propylene, is the repeating structural unit derived from an alpha-olefin copolymer with an alkyl acrylate or methacrylate; preferably a copolymer of ethylene and ethyl acrylate, and where k is 2 to 100.

7) A compound of the formula

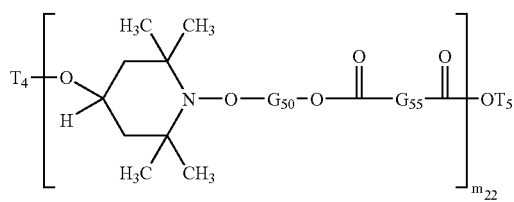

Wherein m is 1 to 100;

$G_{50}$ is straight or branched chain alkylene of 1 to 18 C-atoms, cycloalkylene of 5 to 8 C-atoms, cycloalkenylene of 5 to 8 C-atoms, alkenylene of 3 to 18 C-atoms, a straight or branched chain alkylene of 1 to 4 C-atoms substituted by phenyl or by phenyl substituted by one or two alkyl of 1 to 4 C-atoms, with the proviso that in formula successive hindered amine moieties can be oriented in either a head to head or head to tail fashion;

$T_4$ is hydrogen or

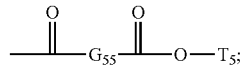

$G_{65}$ is a straight or branched chain alkylene of 1 to 18 C-atoms, cycloalkylene or cycloalkenylene of 5 to 8 C-atoms, phenylene or —NH-alkylene-NH— of 2 to 18 C-atoms, including 5-amino-1-aminomethyl-1,3,3-trimethylcyclohexane and —NH-xylylene-NH—;

$T_5$ is alkyl of 1 to 4 C-atoms;

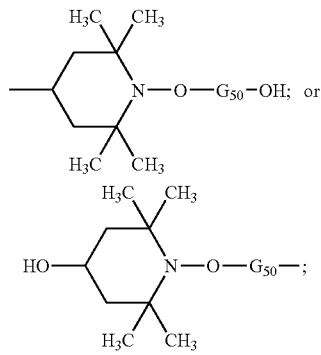

In the above shown oligomeric and polymeric compounds, examples of alkyl are methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methylheptyl, 3-methylheptyl, n-octyl, 2-ethylhexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, eicosyl and docosyl;

Examples of cycloalkyl are cyclopentyl, cyclohexyl, cycloheptyl and cyclooctyl;

An example of $C_7$-$C_9$phenylalkyl is benzyl; and

Examples of alkylene are ethylene, propylene, trimethylene, tetramethylene, pentamethylene, 2,2-dimethyltrimethylene, hexamethylene, trimethylhexamethylene, octamethylene and decamethylene.

h') A compound of the formula

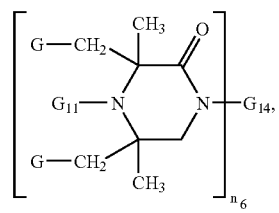

in which $n_6$ is the number 1 or 2, G and $G_{11}$ are as defined under a'), and $G_{14}$ is as defined under b'), but $G_{14}$ cannot be —CONH—Z and —$CH_2$—CH(OH)—$CH_2$—O-D-O—.

(i') A compound of the formula

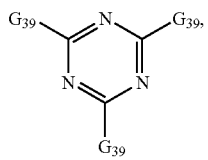

wherein the radicals $G_{39}$, independently of one another, are a group of the formula

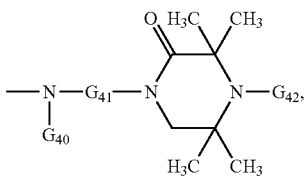

in which $G_{40}$ is $C_1$-$C_{12}$alkyl or $C_5$-$C_{12}$cycloalkyl, $G_{41}$ is $C_2$-$C_{12}$alkylene and $G_{42}$ is as defined for $G_{11}$ above.

Alkyl is for example $C_1$-$C_4$alkyl, in particular methyl, ethyl, propyl or butyl.

Cycloalkyl is preferably cyclohexyl.

Alkylene is for example ethylene, propylene, trimethylene, tetramethylene, pentamethylene, 2,2-dimethyltrimethylene or hexamethylene.

Alkenyl is preferably allyl.

Phenylalkyl is preferably benzyl.

Acyl is preferably acetyl.

j') A compound of the formula

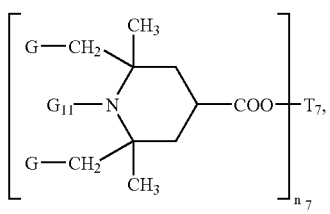

wherein G, $G_{11}$ are as defined above and when $n_7$ is 1, $T_7$ is hydrogen, $C_1$-$C_{12}$alkyl, $C_3$-$C_5$alkenyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$ aryl, glycidyl, a group of the formula —$(CH_2)_t$—COO-Q or of the formula —$(CH_2)_t$—O—CO-Q wherein t is 1 or 2, and Q is $C_1$-$C_4$alkyl or phenyl; or when $n_7$ is 2, $T_7$ is $C_2$-$C_{12}$alkylene, $C_6$-$C_{12}$arylene, a group —$CH_2CH(OH)$—$CH_2$—O—X—O—$CH_2$—$CH(OH)$—$CH_2$— wherein X is $C_2$-$C_{10}$alkylene, $C_6$-$C_{15}$arylene or $C_6$-$C_{12}$cycloalkylene, or a group —$CH_2CH(OZ')CH_2$—(OCH$_2$—CH(OZ')CH$_2$)$_2$— wherein Z' is hydrogen, $C_1$-$C_{18}$alkyl, allyl, benzyl, $C_2$-$C_{12}$alkanoyl or benzoyl.

k') A compound of the formula

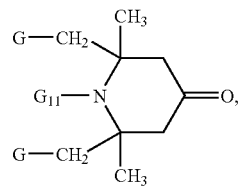

wherein G, $G_{11}$ are as defined above.

l') A compound of the formula

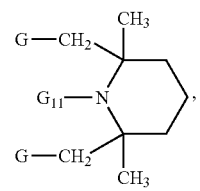

wherein G, $G_{11}$ are as defined above.

m') A compound of the formula (1m)

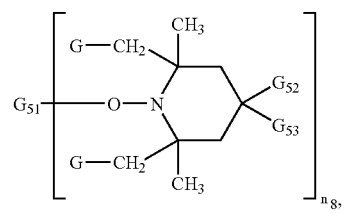

wherein G is as defined above, $n_8$ is 1, 2 or 3;

If $n_8$ is 1, $G_{51}$ is -$G_{50}$-O—CO-$G_{56}$; $G_{52}$ is —O—CO-$G_{56}$; and $G_{53}$ is hydrogen; where $G_{56}$ is alkyl or —NH-alkyl of 1 to 18 C-atoms or —NH-cycloalkyl of 5 to 8 C-atoms;

If $n_8$ is 2, $G_{51}$ is alkylene of 1 to 18 C-atoms, hydroxyalkylene of 3 to 18 C-atoms, cycloalkylene of 5 to 8 C-atoms, cycloalkenylene or hydroxycycloalkylene of 5 to 8 C-atoms, alkenylene of 3 to 18 C-atoms, or a straight or branched chain alkylene of 1 to 4 C-atoms or hydroxyalkylene of 2 to 4 C-atoms substituted by phenyl or by phenyl substituted by one or two alkyl of 1 to 4 C-atoms; or $G_{61}$ is a divalent acyl radical of an aliphatic, cycloaliphatic, araliphatic or aromatic dicarboxylic acid or of a dicarbamic acid, preferably an acyl radical of an aliphatic dicarboxylic acid having 2-18 C atoms, of a cycloaliphatic or aromatic dicarboxylic acid having 8-14 C atoms, If $n_8$ is 3, $G_{51}$ is alkanetriyl of 1 to 18 C-atoms, hydroxyalkanetriyl of 3 to 18 C-atoms, cycloalkanetriyl of 5 to 8 C-atoms, cycloalkenetriyl of 5 to 8 C-atoms, alkenetriyl of 3 to 18 C-atoms, a straight or branched chain alkanetriyl of 1 to 4 C-atoms substituted by phenyl or by phenyl substituted by one or two alkyl of 1 to 4 C-atoms;

If $n_8$ is 2 or 3, $G_{52}$ is hydrogen; —O-$G_{12}$; —N($G_{13}$)$G_{14}$; —O-$G_{15}$; —COO-$T_7$; or is a group of one of the formulae

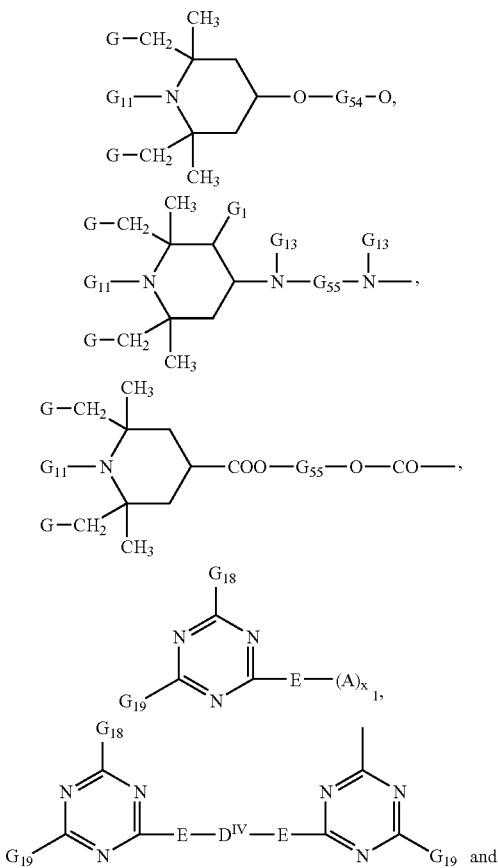

$G_{53}$ is hydrogen or, if $G_{52}$ is —O-$G_{15}$, is O-$G'_{15}$;
or $G_{52}$ and $G_{53}$ together are =O; or a group of the formula

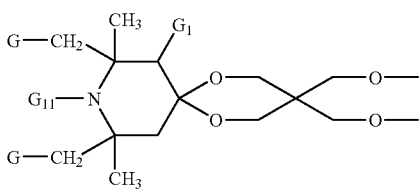

wherein $G_{11}$ and $G_{12}$ are as defined above under a') if $n_1$ is 1; $G_{13}$ and $G_{14}$ are as defined above under b') if $n_2$ is 1; $G_{15}$ and $G'_{15}$ are as defined above under c') if $n_3$ is 1; $G_{18}$, $G_{19}$, A, E, $D^{IV}$, $x_1$ are as defined above under e'); $T'_7$ is as defined above under (j') if $n_7$ is 1;

$G_{54}$ is as defined for $G_{12}$ under a') if $n_1$ is 2; $G_{55}$ is as defined for $G_{14}$ under b') if $n_2$ is 2; $G_{56}$ is as defined for $T_7$ under j') if $n_7$ is 2.

Acyl is a residue of a carboxylic acid preferably containing 2 to 18 C-atoms; examples for monovalent acyl radicals include acyl radicals of an aliphatic or unsaturated aliphatic carboxylic or carbamic acid, an acyl radical of a cycloaliphatic carboxylic or carbamic acid, or acyl radical of an aromatic acid, like acetyl, propionyl, butyryl, (meth)acryloyl and the like up to stearoyl, benzoyl, cinnamoyl; a divalent acyl radical of an aliphatic or unsaturated aliphatic dicarboxylic or dicarbamic acid, or a cycloaliphatic dicarboxylic or dicarbamic acid, or a divalent acyl radical of an aromatic dicarboxylic acid like oxalic acid, maleic acid, succinic acid, phthalic acid etc.; a trivalent acyl radical of an aliphatic, unsaturated aliphatic, or cycloaliphatic tricarboxylic acid or tricarbamic acid, or a trivalent acyl radical of an aromatic tricarboxylic or tricarbamic acid, or a trivalent acyl radical of a tris(alkylcarbamic acid) derivative of cyanuric acid containing 12-24 C-atoms, such as 1,3,5-tris[6-carboxyaminohexyl]-2,4,6-trioxo-s-triazine; or a tetravalent acyl radical of an aliphatic, cycloaliphatic or aromatic tetracarboxylic acid, like 1,2,3,4-butanetetracarboxylic acid, 1,2,3,4-but-2-enetetracarboxylic acid, 1,2,3,5-pentanetetracarboxylic acid and 1,2,4,5-pentanetetracarboxylic acid.

Alkyl is usually alkyl of 1-18 C-atoms, unless otherwise indicated. Cycloalkyl usually contains 5-12 C-atoms and preferably stands for cyclopentyl, cyclohexyl, cycloheptyl, cyclooctyl, cyclododecyl. Aryl is preferably phenyl.

Nitroxyl hindered amines of component (C) where L is O are for example those disclosed in WO99/05108.

Typical nitroxyl compounds of component (C) where L is O include bis(1-oxyl-2,2,6,6-tetramethylpiperidin-4-yl)sebacate, 4-hydroxy-1-oxyl-2,2,6,6-tetramethylpiperidine, 4-ethoxy-1-oxyl-2,2,6,6-tetramethylpiperidine, 4-propoxy-1-oxyl-2,2,6,6-tetramethylpiperidine, 4-acetamido-1-oxyl-2,2,6,6-tetramethylpiperidine, 1-oxyl-2,2,6,6-tetramethylpiperidine, 1-oxyl-2,2,6,6-tetramethylpiperidin-4-one, 1-oxyl-2,2,6,6-tetramethylpiperidin-4-yl acetate, 1-oxyl-2,2,6,6-tetramethylpiperidin-4-yl 2-ethylhexanoate, 1-oxyl-2,2,6,6-tetramethylpiperidin-4-yl stearate, 1-oxyl-2,2,6,6-tetramethylpiperidin-4-yl benzoate, 1-oxyl-2,2,6,6-tetramethylpiperidin-4-yl 4-t-butyl-benzoate, bis(1-oxyl-2,2,6,6-tetramethylpiperidin-4-yl)succinate, bis(1-oxyl-2,2,6,6-tetramethylpiperidin-4-yl)adipate, bis(1-oxyl-2,2,6,6-tetramethylpiperidin-4-yl)n-butylmalonate, bis(1-oxyl-2,2,6,6-tetramethylpiperidin-4-yl)phthalate, bis(1-oxyl-2,2,6,6-tetramethylpiperidin-4-yl)isophthalate, bis(1-oxyl-2,2,6,6-tetramethylpiperidin-4-yl)terephthalate, bis(1-oxyl-2,2,6,6-tetramethylpiperidin-4-yl)hexahydroterephthalate, N,N'-bis(1-oxyl-2,2,6,6-tetramethylpiperidin-4-yl)adipamide, N-(1-oxyl-2,2,6,6-tetramethylpiperidin-4-yl)caprolactam, N-(1-oxyl-2,2,6,6-tetramethylpiperidin-4-yl)dodecylsuccinimide, 2,4,6-tris-[N-butyl-N-(1-oxyl-2,2,6,6-tetramethylpiperidin-4-yl)]-s-triazine, 4,4'-ethylenebis(1-oxyl-2,2,6,6-tetramethylpiperazin-3-one), 2-oxyl-1,1,3,3-tetramethyl-2-isobenzazole, 1-oxyl-2,2,5,5-tetramethylpyrrolidine, and N,N-bis-(1,1,3,3-tetramethylbutyl)nitroxide.

Nitroxyl stabilizers of component (C) are for example bis(1-oxyl-2,2,6,6-tetramethylpiperidin-4-yl)sebacate, 4-hydroxy-1-oxyl-2,2,6,6-tetramethylpiperidine, 4-ethoxy-1-oxyl-2,2,6,6-tetramethylpiperidine, 4-propoxy-1-oxyl-2,2,6,6-tetramethylpiperidine, 4-acetamido-1-oxyl-2,2,6,6-tetramethylpiperidine, 1-oxyl-2,2,6,6-tetramethylpiperidine, and 1-oxyl-2,2,6,6-tetramethylpiperidin-4-one.

A specific embodiment is where the nitroxyl stabilizers of component (C) are bis(1-oxyl-2,2,6,6-tetramethylpiperidin-4-yl)sebacate and 4-hydroxy-1-oxyl-2,2,6,6-tetramethyl-piperidine.

Hydroxylamine stabilizers of component (C) where L is —OH are for example those disclosed in U.S. Pat. Nos. 4,590,231, 4,668,721, 4,691,015, 4,831,134, 5,006,577, and 5,064,883.

Alkoxyamine or hydroxyalkoxyamine stabilizers of component (C) where L is —O-E, are for example those disclosed in U.S. Pat. Nos. 5,004,770; 5,096,950; 5,112,890; 5,124,378; 5,145,893; 5,204,473; 5,216,156; 5,300,544; 5,844,026; 6,117,995; or the publications WO 99/00450 and GB-A-2,347,928 as well as published U.S. patent applications Nos. 09/257,711 and 09/794,710.

Component (C) may be a single compound or a mixture of compounds.

Typical alkoxyamine or hydroxyalkoxyamine stabilizers of component (C) where L is —O-$E_1$ include
- (a) The reaction product of 2,4-bis[(1-cyclohexyloxy-2,2,6,6-piperidin-4-yl)-butylamino]-6-chloro-s-triazine with N,N'-bis(3-aminopropyl)ethylenediamine) [CAS Reg. No. 191680-81-6];
- (b) 1-Cyclohexyloxy-2,2,6,6-tetramethyl-4-octadecylaminopiperidine;
- (c) bis(1-Octyloxy-2,2,6,6-tetramethylpiperidin-4-yl)sebacate;
- (d) 2,4-bis[(1-Cyclohexyloxy-2,2,6,6-tetramethylpiperidin-4-yl)butylamino]-6-(2-hydroxyethylamino-s-triazine;
- (e) bis(1-Cyclohexyloxy-2,2,6,6-tetramethylpiperidin-4-yl)adipate;
- (f) 2,4-bis[(1-Cyclohexyloxy-2,2,6,6-piperidin-4-yl)butylamino]-6-chloro-s-triazine;
- (g) 1-(2-Hydroxy-2-methylpropoxy)-4-octadecanoyloxy-2,2,6,6-tetramethylpiperidine; or
- (h) The compound of formula

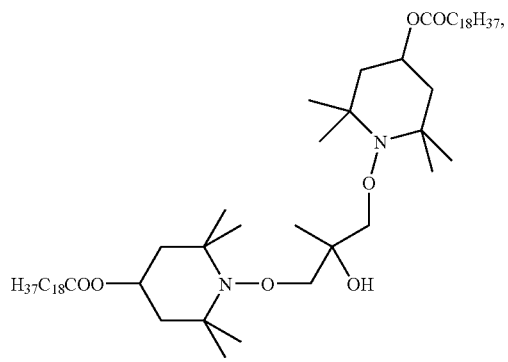

-continued

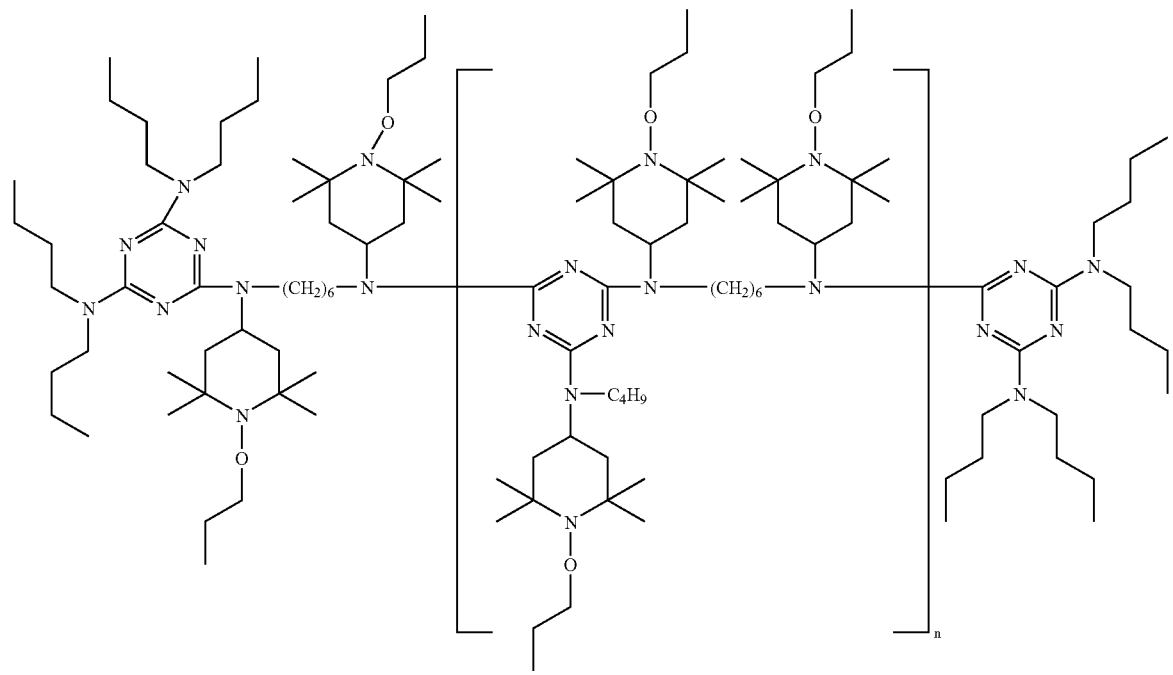

in which n is from 1 to 15.

Compound (9), prepared e.g. according to example 73 of GB-A-2347928, may contain by-products, usually in minor amounts such as 0-5.0%, especially 0.01-1.0% by weight, such as compounds of the following formulae:

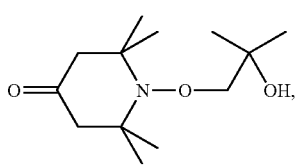

-continued

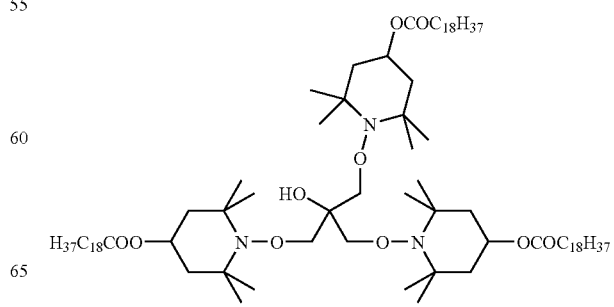

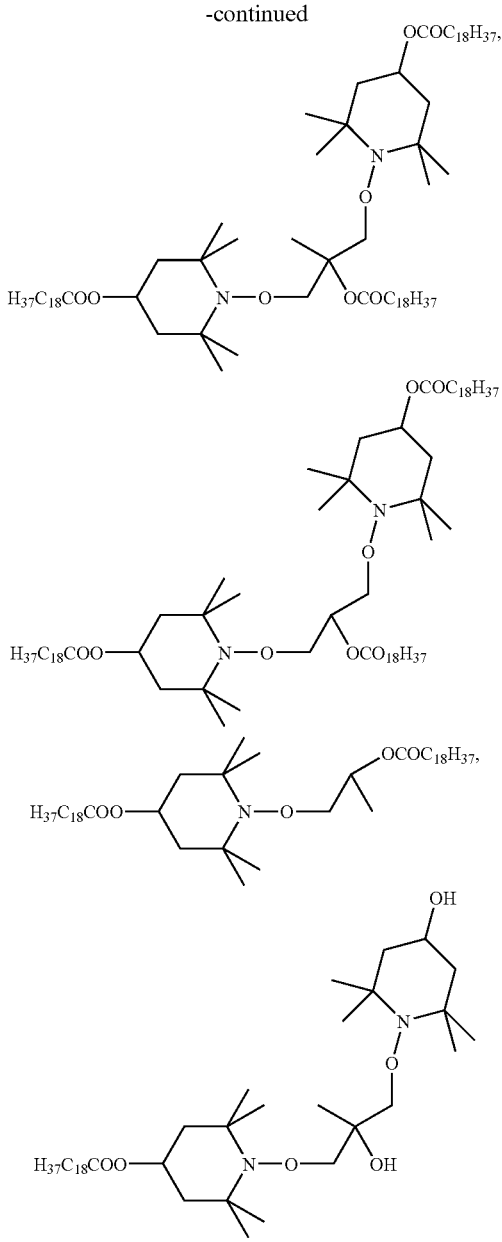

Compound (g) may also be a mixture of compounds with regard to the octadecanoyl moiety, e.g. when prepared from commercial methyl stearate containing, in addition to the stearate group, the hexadecanoic, eicosanoic and oleic acid ester groups, among other chain lengths.

Compound (h) is disclosed in Example 2 of U.S. Pat. No. 6,117,995.

Preferably the sterically hindered alkoxyamine or hydroxyalkoxyamine is the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6]; bis(1-octyloxy-2,2,6,6-tetramethylpiperidin-4-yl)sebacate; or the above compounds (g) and/or (h).

Compositions of the invention containing at least one sterically hindered amine compound are preferred, e.g. one or more of the above sterically hindered amine compounds (a)-(h). The sterically hindered amine of component (C) is advantageously contained in the composition of the invention in an amount from 0.1 to 10.0% by weight based on the polymeric substrate (A); more preferably 0.25 to 8.0% by weight; and most preferably 0.5 to 3.0% by weight.

Synergists are preferably halogen-free and selected from
(a') Nitroxyl stabilizers,
(b') Hydroxylamine stabilizers,
(c') Nitrone stabilizers,
(d') Substituted hydroxylamine stabilizers,
(e') Amine oxide stabilizers,
(f') Benzofuranone stabilizers,
(g') Phosphite and phosphonite stabilizers,
(h') Quinone methide stabilizers and
(i') Monoacrylate esters of 2,2'-alkylidenebisphenol stabilizers.

Preferred synergist components (a')-(i') are the ones discloses in WO 02/074847 and the references cited therein; see especially pages 3-32 of this reference.

For imparting especially good weathering properties of the flame-retardant composition (stability against light, heat and humidity, e.g. suitable for outdoor weathering), a combination of present component B with a sterically hindered amine as explained above for component C and/or a light stabilizer, e.g. selected from paragraph 2 of the below list, may advantageously be contemplated; using a low molecular weight sterically hindered amine ether and a high molecular weight sterically hindered amine is preferred.

Thus, the present invention further pertains to a flame-retardant and weather-stable composition comprising
A) A thermoplastic polymer, especially a polyolefin,
B) A flame-retardant of formula I and/or II as defined above and
C) A combination of sterically hindered amine light stabilizers comprising
c1) A low molecular weight sterically hindered amine ether, and
c2) A high molecular weight secondary or alkylated or polymeric tertiary sterically hindered amine or sterically hindered amine ether.

This composition preferably contains
(c1) 40 to 95 parts by weight a low molecular weight sterically hindered amine ether, e.g. of the hydroxyhydrocarbyloxyamine or hydrocarbyloxyamine group, and
c2) 5 to 60 parts by weight of the high molecular weight sterically hindered amine.

The low molecular weight sterically hindered amine (c1) preferably is within the molecular weight range from 200 to 1000 g/mol, and the high molecular weight sterically hindered amine (c2) preferably is within the molecular weight range from 1200 to 10000 g/mol. Component (B) may, for example, be contained in an amount from 0.5 to 50.0% by weight, and the sum of components (c1) and (c2) in an amount of 0.01 to 10.0% by weight, each based on the weight of component (A).

If the addition of a conventional flame-retardant as explained for present component C further above is desired, e.g. for broader improvement of flame retardancy while retaining good weathering stability, this flame-retardant is preferably selected from ammonium polyphosphate, halogenated and/or melamine based flame-retardants, especially from the compounds
b1) Melamine based flame-retardants and/or ammonium polyphosphate,
b2) bis-(Hexachlorocyclopentadieno) cyclooctane,
b3) tris-(2,3-Dibromopropyl)-isocyanurate,
b4) Ethylene-bis-tetrabromophthalimide, b5) 1,2,5,6,9,10-Hexabromo-cyclo-dodecane,
b6) Ethane-1,2-bis(pentabromophenyl),
b7) tris(3-Bromo-2,2-bis(bromomethyl)propyl)phosphate.

Combinations of this type components (c1) and (c2), optionally together with a further conventional flame-retardant, to be used as component (C) in present invention may be those disclosed in GB-A-2373507 or WO 03050175.

The ratio of components B and C may vary within wide limits and is dependent upon the intended use. Examples of ratios B:C are from 5:95 to 95:5, e.g. from 10:90 to 90:10, preferably from 20:80 to 80:20, especially from 30:70 to 70:30 and from 40:60 to 60:40.

The composition of the invention may contain further components other than those described above for component C. For example, the composition of the invention may comprise an antioxidant, a processing stabiliser, a light stabiliser, a metal deactivator, a hydroxylamine, a nitroxyl stabilizer, a nitrone stabilizer, a substituted hydroxylamine stabilizer, an amine oxide stabilizer, a benzofuranone stabilizer, a quinone methide stabilizer, a monoacrylate ester of 2,2'-alkylidenebisphenol, a thiosynergistic compound, a copper salt, a nucleating agent, a filler, a reinforcing agent, a pigment, a further flame-retardant or/and an antistatic agent.

The processing stabilizer is preferably selected from organic phosphites and/or phosphonites, the light stabilizer preferably is selected from sterically hindered amines and/or ultraviolet absorbers of the benzotriazole, benzophenone, oxanilide and/or triazine group, the further flame-retardant preferably is selected from tetraphenyl resorcinol diphosphite, triphenyl phosphate, ammonium polyphosphate, resorcinol diphosphate oligomer, calcium sulphate, magnesium carbonate, melamine based flame-retardants such as melamine phosphates and melamine pyrophosphates, halogenated flame-retardants with or without antimony synergist, molybdenum trioxide, zinc oxide, magnesium hydroxide, alumina trihydrate, zinc borate, ethylenediamine diphosphate, silica, silicones, calcium silicate, magnesium silicate.

A halogenated flame-retardant is routinely combined with an inorganic oxide synergist. Most common for this use are zinc or antimony oxides, e.g. $Sb_2O_3$ or $Sb_2O_5$.

Preferred is a composition containing less than 1.0% by weight of antimony compounds and halogen compounds.

Further advantageous is a composition according to the invention containing less than 3.0% by weight of fillers.

As noted above, the composition according to the invention additionally may contain one or more conventional additives, for example selected from pigments, dyes, plasticizers, antioxidants, thixotropic agents, levelling assistants, basic costabilizers, metal passivators, metal oxides, organophosphorus compounds, hydroxylamines, further light stabilizers and mixtures thereof, especially pigments, phenolic antioxidants, calcium stearate, zinc stearate, sterically hindered amines, UV absorbers of the 2-hydroxy-benzophenone, 2-(2'-hydroxyphenyl)-benzotriazole and/or 2-(2-hydroxyphenyl)-1,3,5-triazine groups. More specific examples are the following components:

1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example 2,6-di-nonyl-4-methylphenol, 2,4-dimethyl-6-(1'-methyl-lundec-1'-yl) phenol, 2,4-dimethyl-6-(1'-methylheptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-, β-, γ-, δ-tocopherol and mixtures thereof (vitamin E).

1.5. Hydroxylated thiodiphenyl ethers, for example 2, 2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl) disulphide.

1.6. Alkylidenebisphenols, for example 2, 2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3, 5,3',5'-tetra-tert-butyl-4,4'-dihydroxy-dibenzyl ether, octadecyl-4-hydroxy-3,5-dimethylbenzylmercaptoacetate, tridecyl-4-hydroxy-3,5-di-tert-butylbenzylmercaptoacetate, tris(3, 5-di-tert-butyl-4-hydroxybenzyl)amine, bis(4-tert-butyl-3-hydroxy-2,6-dimethylbenzyl)dithioterephthalate, bis(3, 5-di-tert-butyl-4-hydroxybenzyl)sulphide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl) malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3, 5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)-isocyanurate, N,N'-bis(hydroxyethyl) oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis [2-{3-(3-tert-butyl-4-hydroxy-5-methylphenyl)propionyloxy}1,1-dimethylethyl]-2,4,8,10-tetraoxaspiro[5.5]undecane.

1.15. Esters of β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo [2.2.2]octane.

1.17. Amides of β-(3,5-di-tert-butyl-4-hydroxyphenyl)propionic acid e.g. N,N-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugard® XL-1, supplied by Uniroyal).

1.18. Ascorbic acid (vitamin C)

1.19. Aminic antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulphamoyl) diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tertctylidiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl) amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-bis[(2-methylphenyl)amino]ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenylamines, a mixture of mono- and dialkylated nonyidiphenylamines, a mixture of mono- and dialkylated dodecyldiphenylamines, a mixture of mono- and dialkylated isopropyl/isohexyldiphenylamines, a mixture of mono- and dialkylated tert-butyldiphenylamines, 2,3-dihydro-3,3-dimethyl-4H-1,4-benzothiazine, phenothiazine, a mixture of mono- and dialkylated tertbutyl/tert-ctylphenothiazines, a mixture of mono- and dialkylated tert-octylphenothiazines, N-allylphenothiazine, N,N,N',N'-tetraphenyl-1,4-diaminobut-2-ene, N,N-bis(2,2,6,6-tetramethylpiperid-4-yl-hexamethylenediamine, bis(2,2,6,6-tetramethylpiperid-4-yl)sebacate, 2,2,6,6-tetramethylpiperidin-4-one, 2,2,6,6-tetramethylpiperidin-4-ol.

2. Light Stabilisers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, 2-(3'- tert-butyl-2'-hydroxy-5'-(2-octyloxycarbonyl-ethyl) phenyl)-5-chlorobenzotriazole, 2-(3'-tert-butyl-5'-[2-(2-ethylhexyloxy)carbonyl-ethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, 2-(3'-tert-butyl-2'-hydroxy-5'-(2-isooctyloxycarbonylethyl) phenylbenzotriazole, 2,2'-methylenebis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$, where R=3'-tert-butyl-4'-hydroxy-5'-2H-benzotriazol-2-ylphenyl, 2-[2'-hydroxy-3'-(α,α-dimethyl benzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butylphenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thiobis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyl-dithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Further sterically hindered amines, for example bis(2,2,6,6-tetramethyl-4-piperidyl)-sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl)sebacate, bis(1,2,2,6,6-pentamethyl-4-piperidyl) n-butyl-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis (2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl) hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, a mixture of 4-hexadecyloxy- and 4-stearyloxy-2,2,6,6-tetramethylpiperidine, a condensate of N,N'-bis(2,2,6,6-tetramethyl-4-piperidyl)hexamethylenediamine and 4-cyclohexylamino-2,6-dichloro-1,3,5-triazine, a condensate of 1,2-bis(3-aminopropylamino) ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl) hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine.

2.7. Oxamides, for example 4, 4'-dioctyloxyoxanilide, 2,2'-diethoxyoxanilide, 2,2'-dioctyl-oxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl) oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy) phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/ tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl) 1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy) phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]-phenyl}-4,6-bis(2,4-dimethylphenyl)-1,3,5-triazine.

3. Metal deactivators, for example N,N'-diphenyloxamide, N-salicylal-N'-salicyloyl hydrazine, N,N'-bis(salicyloyl) hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyladipoyl dihydrazide, N,N'-bis(salicyloyl)oxalyl dihydrazide, N,N'-bis(salicyloyl)thiopropionyl dihydrazide.

4. Further phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butyl-phenyl)pentaerythritol diphosphite, tristearyl sorbitol triphosphite, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-[2-methyl-dibenz[d,g]-1,3,2-dioxaphosphocin, 2,2',2"-nitrilo[triethyltris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butylphenoxy)-1,3,2-dioxaphosphirane.

The following phosphites are especially preferred:
Tris(2,4-di-tert-butylphenyl)phosphite (Irgafos® 168, Ciba Specialty Chemicals), tris(nonylphenyl)phosphite,

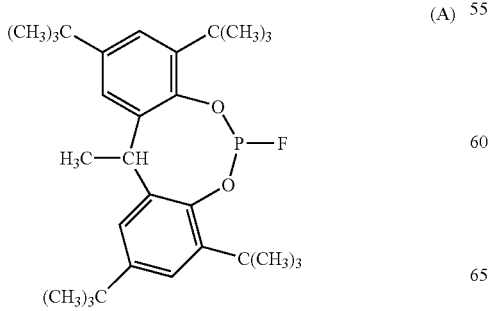

(A)

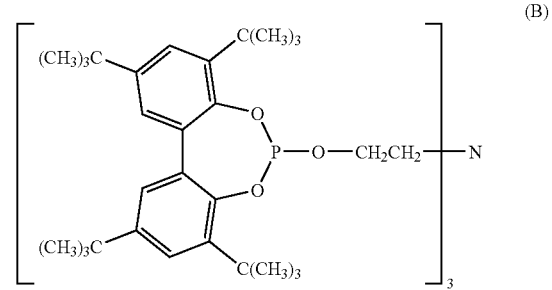

(B)

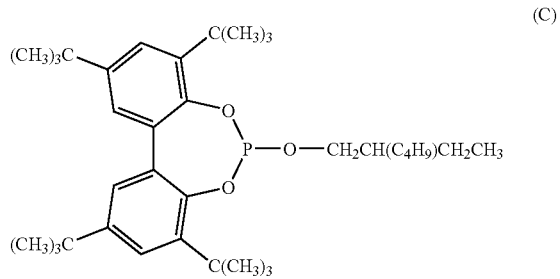

(C)

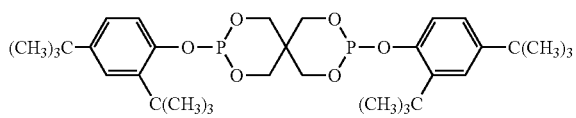

(D)

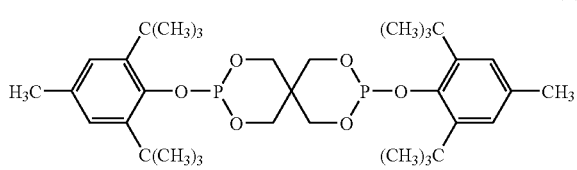

(E)

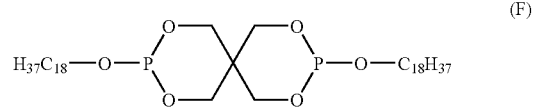

(F)

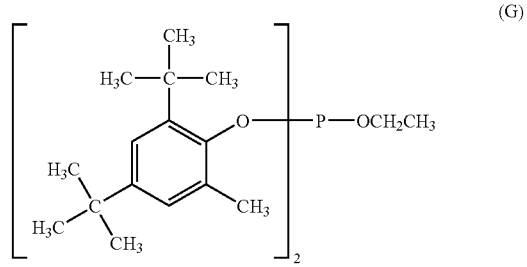

(G)

5. Further hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxylamine derived from hydrogenated tallow amine.

6. Further nitrones, for example N-benzyl-alpha-phenylnitrone, N-ethyl-alpha-methylnitrone, N-octyl-alpha-heptylnitrone, N-lauryl-alpha-undecylnitrone, N-tetradecyl-alpha-tride-cyinitrone, N-hexadecyl-alpha-pentadecylnitrone, N-octadecyl-alpha-heptadecylnitrone, N-hexadecyl-alpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.
7. Thiosynergists, for example dilauryl thiodipropionate or distearyl thiodipropionate.
8. Peroxide scavengers, for example esters of β-thiodipropionic acid, for example the lauryl, stearyl, myristyl or tridecyl esters, mercaptobenzimidazole or the zinc salt of 2-mercaptobenzimidazole, zinc dibutyldithiocarbamate, dioctadecyl disulphide, pentaerythritol tetrakis(β-dodecylmercapto)propionate.
9. Polyamide stabilisers, for example copper salts in combination with iodides and/or phosphorus compounds and salts of divalent manganese.
10. Basic co-stabilisers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty acids, for example calcium stearate, zinc stearate, magnesium behenate, magnesium stearate, sodium ricinoleate and potassium palmitate, antimony pyrocatecholate or zinc pyrocatecholate.
11. Nucleating agents, for example inorganic substances, such as talcum, metal oxides, such as titanium dioxide or magnesium oxide, phosphates, carbonates or sulphates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.
12. Further fillers and reinforcing agents, for example calcium carbonate, silicates, glass fibres, glass bulbs, asbestos, talc, kaolin, mica, barium sulphate, metal oxides and hydroxyides, carbon black, graphite, wood flour and flours or fibers of other natural products, synthetic fibres.
13. Other additives, for example plasticisers, lubricants, emulsifiers, pigments, rheology additives, catalysts, flow-control agents, optical brighteners, flame proofing agents, antistatic agents and blowing agents.
14. Further benzofuranones and indolinones, for example those disclosed in U.S. Pat. Nos. 4,325,863; 4,338,244; 5,175,312; 5,216,052; 5,252,643; DE-A4316611; DE-A-4316622; DE-A-4316876; EP-A-0589839 or EP-A-0591102 or 3-[4-(2-acetoxyethoxy)-phenyl]-5,7-di-tert-butylbenzofuran-2-one, 5,7-di-tert-butyl-3-[4-(2-stearoyloxyethoxy)-phenyl]benzofuran-2-one, 3,3'-bis[5,7-di-tert-butyl-3-(4-[2-hydroxyethoxy]phenyl) benzofuran-2-one], 5,7-di-tert-butyl-3-(4-ethoxyphenyl) benzofuran-2-one, 3-(4-acetoxy-3,5-dimethylphenyl)-5,7-di-tert-butylbenzofuran-2-one, 3-(3,5-dimethyl-4-pivaloyloxyphenyl)-5,7-di-tert-butylbenzofuran-2-one, 3-(3,4-dimethylphenyl)-5,7-di-tert-butylbenzofuran-2-one, 3-(2,3-dimethylphenyl)-5,7-di-tert-butylbenzofuran-2-one.

The additives mentioned above are preferably contained in an amount of 0.01 to 10.0%, especially 0.05 to 5.0%, relative to the weight of the polymer component (A).

The incorporation of the additives of the invention and optional further components into the polymer is carried out by known methods such as dry blending in the form of a powder, or wet mixing in the form of solutions, dispersions or suspensions for example in an inert solvent, water or oil. The additives of the invention and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc.), e.g. as a dry mixture or powder or as solution or dispersion or suspension or melt.

Therefore, the present invention further pertains to a process for imparting flame retardancy to an organic polymer, which process comprises incorporation of a compound of formula I and/or II as defined above into the polymer.

The invention relates further to a process for imparting both light stability and flame retardancy to an organic polymer, which process comprises incorporation of a compound of formula I and/or II and a sterically hindered amine and/or light stabilizer into the polymer, as well as to the use of a compound of the formula I and/or a compound of the formula II as a flame-retardant for an organic polymer.

The incorporation can be carried out in a heatable container equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

An embodiment of special technical importance is a flame-retardant additive combination (blend) comprising
  (i) At least one compound selected from the group consisting of the
    (a) Sterically hindered nitroxyl stabilizers,
    (b) Sterically hindered hydroxylamine stabilizers and
    (c) Sterically hindered alkoxyamine or cycloalkoxyamine stabilizers and
  (ii) At least one compound of formula I.

This flame-retardant additive composition preferably contains 20.0-100.0%, especially 25.0-90.0%, by weight of the total composition, of component (ii).

The addition of the additive or additive blend to the polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contra rotating and co rotating twin-screw extruders, planetary-gear extruders, ring extruders or co kneaders. It is also possible to use processing machines provided with at least one gas removal compartment to which a vacuum can be applied.

Suitable extruders and kneaders are described, for example, in *Handbuch der Kunststoffextrusion, Vol.* 1 Grundlagen, Editors F. Hensen, W Knappe, H. Potente, 1989, pp. 3-7, ISBN:3-446-143394 (Vol. 2 Extrusionsanlagen 1986, ISBN 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process of the present invention can also be carried out at a level lower than maximum throughput by varying the parameters mentioned or employing weighing machines delivering dosage amounts.

If a plurality of components is added, these can be premixed or added individually.

The additives of the invention and optional further additives can also be sprayed onto the polymer material. They are able to dilute other additives (for example the conventional additives indicated above) or their melts so that they can be sprayed also together with these additives onto the material. Addition by spraying during the deactivation of the polymerisation catalysts is particularly advantageous; in this case, the steam evolved may be used for deactivation of the catalyst. In the case of spherically polymerised polyolefins it may, for example, be advantageous to apply the additives of the invention, optionally together with other additives, by spraying.

The additives of the invention and optional further additives can also be added to the polymer in the form of a masterbatch ("concentrate") which contains the components in a concentration of, for example, about 1.0% to about 40.0% and preferably 2.0% to about 20.0% by weight incorporated in a polymer. The polymer must not be necessarily of identical structure than the polymer where the additives are added finally. In such operations, the polymer can be used in the form of powder, granules, solutions, and suspensions or in the form of lattices.

Incorporation can take place prior to or during the shaping operation. The materials containing the additives of the invention described herein preferably are used for the production of molded articles, for example rotomolded articles, injection molded articles, profiles and the like, and especially a fiber, spun melt non-woven, film or foam.

Thus, present invention further pertains to a molded or extruded article, a fiber, spun melt non-woven or a foam comprising the composition of the invention.

The invention is further illustrated by the following application examples. These are meant for illustrative purposes only and are not to be construed to limit the scope of this invention in any manner whatsoever. Where given, room temperature depicts a temperature in the range 20-25° C. Percentages are by weight of the polymer substrate unless otherwise indicated.

The effective flame retarding amount of component (B) is that needed to show flame retarding efficacy as measured by one of the standard methods used to assess flame retardancy. These include the DIN 4201-Part 1 and Limiting Oxygen Index (LOI).

Test Methods

DIN 4201-Part 1, Fire behaviour of building materials and building components, Part 1: Building materials, terminology, requirements and tests, 1998-05

ASTM D-2863, Limiting Oxygen Index (LOI).

ISO 4892-2, Plastics—Methods of exposure to laboratory light sources—Part 2: Xenon-arc sources.

Test Compounds

PHA-1 is the phosphate of the formula:

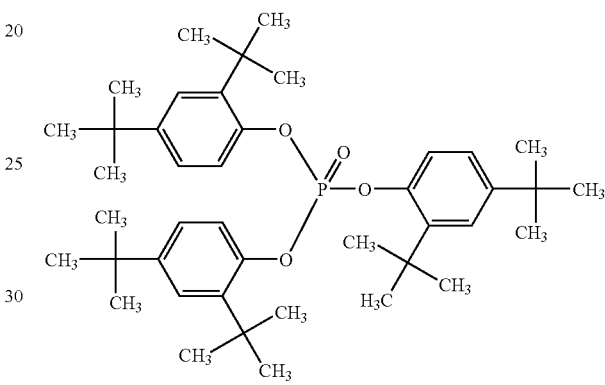

PHA-C is the phosphate 1,3-phenylene-bis(2,6-dimethylphenyl phosphate) of the formula:

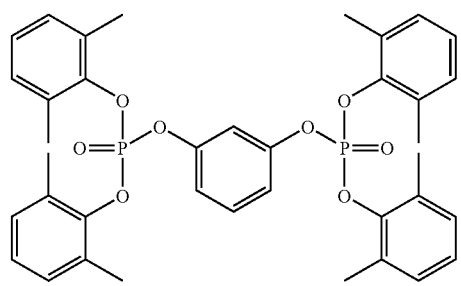

(Phosphate as disclosed in JP-A-2001-348724).

NOR-1 is the reaction product of 2,4-bis[(1-cyclohexyloxy-2,2,6,6-piperidin-4-yl)butylamino]-6-chloro-s-triazine with N,N'-bis(3-aminopropyl)ethylenediamine) [CAS Reg. No. 191680-81-6; described above as sterically hindered amine ether (a)];

NOR-2 is the compound of formula

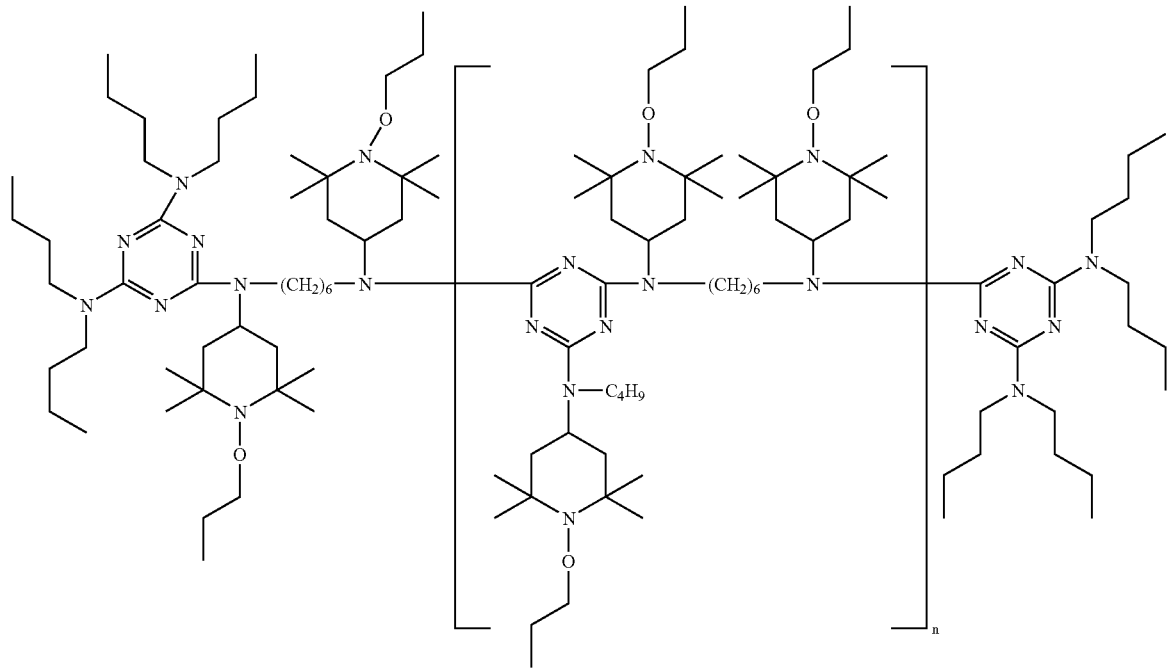

in which n is from 1 to 15 (described above as sterically hindered amine ether (j)).

PP is polypropylene.

Example 1

Extrusion grade polypropylene is dry blended with the test additives and then extruder compounded at 220° C. Base stabilization is 2000 ppm IRGANOX® B 501W and 1000 ppm calcium stearate.

PP multifilaments are melt-spun at 240° C. The fibres consist of 80 single filaments with a total denier of 800 and a draw ratio of 1:3.2. Socks are weaved and then re-pressed at 220° C. into a low residual stress 200-micron film.

Films are subsequently fire tested following the DIN 4102-Part 1 procedure in order to yield comparative FR performance data. Burn lengths are compared.

The results are shown below.

| Formulation | Additive | Classification | Burn Length (mm) after DIN 4102 |
|---|---|---|---|
| Control | None | | 150 |
| 1 | 1.0% PHA-1 | | 80 |
| 2 | 0.5% NOR-1 + 0.5% PHA-1 | | 36 |
| 3 | 1.0% NOR-1 | | 77 |

PHA-1 provides a good flame-retardant effect; the bend PHA-1/NOR-1 is synergistic.

Example 2

Extrusion grade polypropylene is dry blended with the test additives and then extruder compounded. Base stabilization is as described in Example 1.

PP multifilaments are melt-spun at 240° C. The fibres consist of 40 single filaments with a total denier of 200 and a draw ratio of 1:3.2. Socks are knitted and then re-pressed at 220° C. into a low residual stress 200-micron film.

The specimen is tested for flame retardancy according to LOI (ASTM D2863) test specifications.

The results are shown below.

| Additive | LOI (%) |
|---|---|
| 1.0% PHA-1 | 22.6 |
| 0.5% NOR-2 + 0.5% PHA-1 | 26 |
| 1.0% NOR-2 | 23.7 |
| 0.5% NOR-1 + 0.5% PHA-1 | 28.6 |
| 1.0% NOR-1 | 25 |

Example 3

Extrusion grade polypropylene is dry blended with the test additives and then extruder compounded at 220° C. Base stabilization is 2000 ppm IRGANOX® B 501W and 1000 ppm calcium stearate. PP multifilaments are melt-spun at 240° C. The fibres consist of 80 single filaments with a total denier of 800 and a draw ratio of 1:3.2. Socks are knitted and then re-pressed at 220° C. into a low residual stress 200-micron film. Films are subsequently fire tested following the DIN 4102-Part 1 procedure in order to yield comparative FR performance data. Burn lengths are compared. The results are shown below.

| Formulation | Additive | Burn Length (mm) after DIN 4102 |
|---|---|---|
| Control | None | 150 |
| 1 | 1.0% PHA-1 | 80 |
| 2 | 1.0% PHA-C | 150 |

PHA-1 clearly outperforms PHA-C.

Example 4

Extrusion grade polypropylene is dry blended with the test additives and then extruder compounded at 220° C. Base stabilization is 2000 ppm IRGANOX® B 501W and 1000 ppm calcium stearate. PP multifilaments are melt-spun at 240° C. The fibres consist of 80 single filaments with a total denier of 800 and a draw ratio of 1:3.2. Socks are weaved and then re-pressed at 220° C. into a low residual stress 200-micron film. The specimen is tested for flame retardancy according to LOI (ASTM D2863) test specifications. The results are shown below.

| Formulation | Additive | LOI (%) |
|---|---|---|
| Control | None | 22.1 |
| 2 | 0.5% NOR-1 + 0.5% PHA-1 | 27.5 |
| 3 | 0.5% NOR-1 + 0.5% PHA-3 | 25.8 |

The blend NOR-1/PHA-1 clearly outperforms NOR-1/PHA-C.

The invention claimed is:

1. A flame-retardant polymer composition which comprises
   (A) An organic polymer substrate selected from the group consisting of polyolefins, polystyrenes, polyethers and polyamides and
   (B) An effective flame retarding amount of tris(2,4-di-tert-butylphenyl)phosphate.

2. A flame-retardant polymer composition according to claim 1, which additionally comprises at least one compound selected from the group consisting of
   (a) Sterically hindered nitroxyl stabilizers;
   (b) Sterically hindered hydroxylamine stabilizers; and
   (c) Sterically hindered alkoxyamine or cycloalkoxyamine stabilizers.

3. A composition according to claim 1, which contains component (B) in an amount of 0.25 - 10.0% by weight, based on the total weight of the polymer composition.

4. A composition according to claim 1 further comprising a compound containing a moiety of the formula

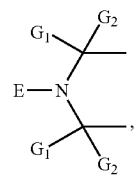

Wherein $G_1$ and $G_2$ are independently $C_1$-$C_8$alkyl or are together pentamethylene;

E is oxyl, hydroxyl, alkoxy, cycloalkoxy, aralkoxy, aryloxy, —O—CO—$OZ_3$, —O—Si($Z_4$)$_3$, —O—PO ($OZ_5$)$_2$ or —O—$CH_2$—$OZ_6$ where $Z_3$, $Z_4$, $Z_5$ and $Z_6$ are selected from the group consisting of hydrogen, an aliphatic, aralphatic and aromatic moiety; or E is —O—T—(OH)$_b$, T is a straight or branched chain $C_1$-$C_{18}$alkylene, $C_5$-$C_{18}$cycloalkylene, $C_5$-$C_{18}$cycloalkenylene, straight or branched chain $C_1$-$C_4$alkylene substituted by phenyl or by phenyl substituted by one or two $C_1$-$C_4$alkylalkyl groups; and b is 1, 2 or 3, with the proviso that b cannot exceed the number of C-atoms in T, and when b is 2 or 3, each hydroxyl group is attached to a different C-atoms of T.

5. A Composition according to claim 4 wherein the further compound is selected from the group consisting of
   (a) The reaction product of 2,4-bis[(1-cyclohexyloxy-2,2,6,6-piperidin-4-yl)butylamino]-6-chloro-s-triazine with N,N'-bis(3-aminopropyl)ethylenediamine),
   (b) 1-Cyclohexyloxy-2,2,6,6-tetramethyl-4-octadecylaminopiperidine,
   (c) bis(1-Octyloxy-2,2,6,6-tetramethylpiperidin-4-y1) sebacate,
   (d) 2,4-bis[(1-Cyclohexyloxy-2,2,6,6-tetramethylpiperidin-4-yl)butylamino]-6-(2-hydroxyethyl amino-s-triazine,
   (e) bis(1-Cyclohexyloxy-2,2,6,6-tetramethylpiperidin-4-y1) adipate,
   (h) 2,4-bis[(1-Cyclohexyloxy-2,2,6,6-piperidin-4-yl)butylamino]-6-chloro-s-triazine,
   (i) 1-(2-Hydroxy-2-methylpropoxy)-4-octadecanoyloxy-2,2,6,6-tetramethylpiperidine and (j) The compound of formula

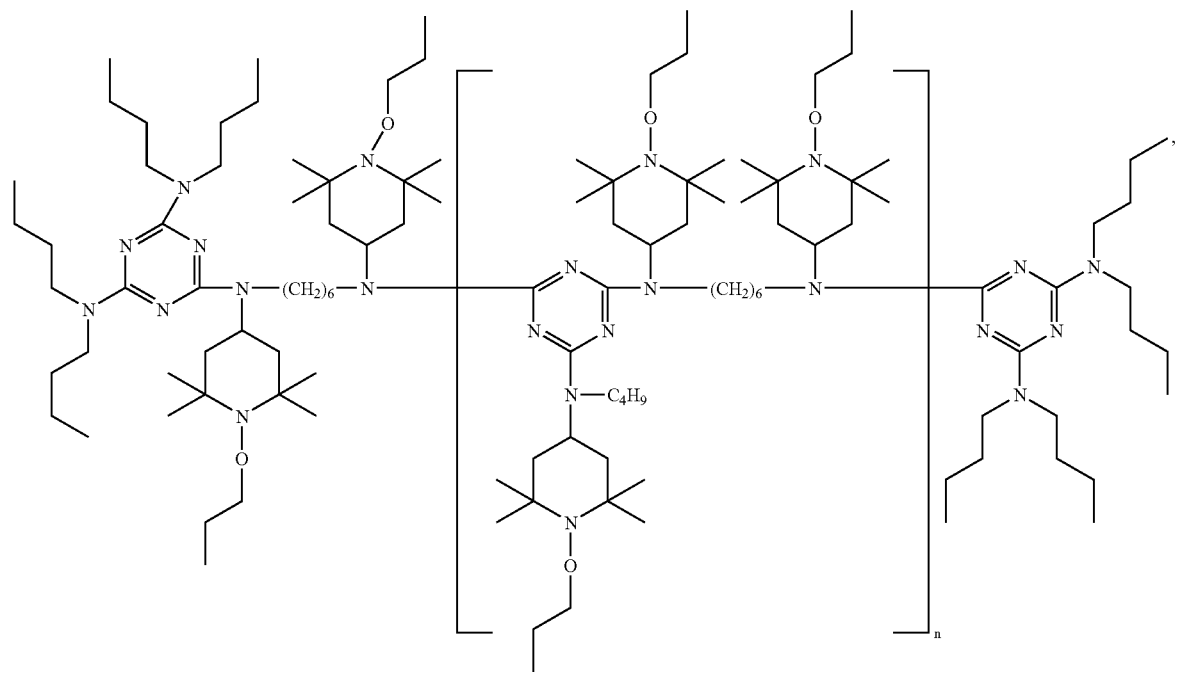

in which n is from 1 to 15.

6. A composition according to claim 1, which additionally comprises an antioxidant, a processing stabiliser, a light stabiliser, a metal deactivator, a hydroxylamine, a nitroxyl stabilizer, a nitrone stabilizer, a substituted hydroxylamine stabilizer, an amine oxide stabilizer, a benzofuranone stabilizer, a quinone methide stabilizer, a monoacrylate ester of 2,2'-alkylidenebisphenol, a thiosynergistic compound, a copper salt, a nucleating agent, a filler, a reinforcing agent, a pigment, a further flame retardant or an antistatic agent.

* * * * *